US012655020B2

(12) United States Patent
Ravikumar et al.

(10) Patent No.: US 12,655,020 B2
(45) Date of Patent: Jun. 16, 2026

(54) GAS REFORMER FOR PRODUCING HYDROGEN

(71) Applicant: Fluor Technologies Corporation, Irving, TX (US)

(72) Inventors: Ravi Ravikumar, Lancaster, CA (US); Sunil Singhal, Gurugram (IN)

(73) Assignee: Fluor Technologies Corporation, Irving, TX (US)

( * ) Notice: Subject to any disclaimer, the term of this patent is extended or adjusted under 35 U.S.C. 154(b) by 407 days.

(21) Appl. No.: 17/677,805

(22) Filed: Feb. 22, 2022

(65) Prior Publication Data

US 2022/0267147 A1      Aug. 25, 2022

Related U.S. Application Data

(60) Provisional application No. 63/151,867, filed on Feb. 22, 2021.

(51) Int. Cl.
C01B 3/48          (2006.01)
C01B 3/501         (2026.01)
(Continued)

(52) U.S. Cl.
CPC ................ C01B 3/48 (2013.01); C01B 3/501 (2013.01); C01B 3/56 (2013.01); (Continued)

(58) Field of Classification Search
CPC ..... C01B 3/48; C01B 3/56; C01B 2203/0244; C01B 2203/0405; C01B 2203/062; C01B 2203/066; C01B 2203/148
See application file for complete search history.

(56) References Cited

U.S. PATENT DOCUMENTS 5,221,524 A  *  6/1993  Eguchi ..................... C01B 3/32
                                                    423/655
6,551,380 B1    4/2003  Reddy
                   (Continued)

FOREIGN PATENT DOCUMENTS

EP          2233433 A1    9/2010
GB          2592695 A     8/2021
               (Continued)

OTHER PUBLICATIONS

Invitation to Pay Additional Fees and, Where Applicable, Protest Fee, dated May 17, 2022, International Patent Application No. PCT/US2022/017352 filed Feb. 22, 2022.
(Continued)

*Primary Examiner* — Matthew J Merkling
(74) *Attorney, Agent, or Firm* — Andrew M. Metrailer; Conley Rose, P.C.

(57)          ABSTRACT

A process for reforming for producing hydrogen and generating electricity, comprises: introducing a feed comprising a hydrocarbon stream to a reformer to produce unshifted synthesis gas (syngas); introducing the unshifted syngas to a water gas shift unit to produce a shifted syngas; removing $CO_2$ from the shifted syngas to produce a $CO_2$ depleted syngas and a $CO_2$ product; introducing the $CO_2$ depleted syngas to a pressure swing adsorption unit to produce a hydrogen product and an off-gas comprising carbon monoxide, carbon dioxide, unreacted methane; splitting a portion of the hydrogen product; and providing the portion of the hydrogen product to an electricity generator for generating electricity for use within the process.

20 Claims, 4 Drawing Sheets

(51) Int. Cl.

| | |
|---|---|
| *C01B 3/56* | (2006.01) |
| *H01M 8/04089* | (2016.01) |
| *H01M 8/0612* | (2016.01) |

(52) U.S. Cl.

CPC ..... *H01M 8/04097* (2013.01); *H01M 8/0618* (2013.01); *C01B 2203/0244* (2013.01); *C01B 2203/0283* (2013.01); *C01B 2203/0405* (2013.01); *C01B 2203/062* (2013.01); *C01B 2203/066* (2013.01); *C01B 2203/148* (2013.01); *C01B 2203/84* (2013.01)

(56) References Cited

U.S. PATENT DOCUMENTS

| | | | |
|---|---|---|---|
| 6,921,597 | B2 | 7/2005 | Keefer |
| 8,580,153 | B2 | 11/2013 | Vauk et al. |
| 9,327,972 | B2 | 5/2016 | Allam |
| 11,505,462 | B2 | 11/2022 | Ravikumar et al. |
| 2003/0138687 | A1* | 7/2003 | Iio ..................... H01M 8/04089 429/413 |
| 2004/0182002 | A1 | 9/2004 | Malhorta et al. |
| 2004/0256116 | A1* | 12/2004 | Olsvik ................ F25J 3/04569 518/703 |
| 2005/0074642 | A1* | 4/2005 | Foger .................. H01M 8/0637 429/513 |
| 2005/0178063 | A1* | 8/2005 | Reinke ...................... C01B 3/48 48/128 |
| 2007/0212295 | A1 | 9/2007 | Woods et al. |
| 2007/0227352 | A1 | 10/2007 | Kumar |
| 2009/0230359 | A1* | 9/2009 | Guvelioglu ............... C01B 3/48 423/652 |
| 2010/0028243 | A1* | 2/2010 | Wang ...................... C10G 2/32 423/443 |
| 2010/0074839 | A1 | 3/2010 | Drnevich et al. |
| 2010/0254893 | A1 | 10/2010 | Kim et al. |
| 2010/0288123 | A1 | 11/2010 | Chen et al. |
| 2011/0158900 | A1 | 6/2011 | MacArthur et al. |
| 2011/0200520 | A1* | 8/2011 | Ramkumar ............ C10K 1/003 423/655 |
| 2012/0039794 | A1 | 2/2012 | Catchpole |
| 2012/0118011 | A1 | 5/2012 | Terrien |
| 2012/0141367 | A1* | 6/2012 | Wynn ..................... C01B 3/382 423/652 |
| 2013/0000320 | A1 | 1/2013 | McKenna et al. |
| 2013/0180258 | A1* | 7/2013 | Robels Macias ..... H02M 7/066 435/141 |
| 2015/0038599 | A1* | 2/2015 | Kresnyak .................. C01B 3/34 518/702 |
| 2016/0256820 | A1 | 9/2016 | Kulkarni |
| 2017/0204335 | A1 | 7/2017 | Ravikumar |
| 2017/0218279 | A1 | 8/2017 | Ravikumar |
| 2019/0135626 | A1 | 5/2019 | Rafati |
| 2021/0188632 | A1 | 6/2021 | Lim et al. |
| 2022/0259042 | A1 | 8/2022 | Ravikumar et al. |
| 2022/0267147 | A1 | 8/2022 | Ravikumar |
| 2022/0352721 | A1* | 11/2022 | Scheiff .................. H02J 15/008 |

FOREIGN PATENT DOCUMENTS

| | | | | |
|---|---|---|---|---|
| WO | WO-2005009892 | A2 * | 2/2005 | ............. C01B 3/384 |
| WO | 2019162236 | A1 | 8/2019 | |
| WO | 2020031063 | A1 | 2/2020 | |
| WO | 2020221642 | A1 | 11/2020 | |
| WO | 2022038089 | A1 | 2/2022 | |
| WO | 2022174195 | A1 | 8/2022 | |
| WO | 2022178439 | A1 | 8/2022 | |

OTHER PUBLICATIONS

International Search Report and Written Opinion dated Jun. 22, 2022, International Patent Application No. PCT/US2022/016468 filed Feb. 15, 2022.

Ravikumar, Ravi et al., "Natural Gas Fed Steam Methane Reformer (SMR) Based Hydrogen Plant," filed Feb. 22, 2021, U.S. Appl. No. 63/151,867.

International Search Report and Written Opinion dated Jul. 19, 2022, International Patent Application No. PCT/US2022/017352 filed Feb. 22, 2022.

Corrected Notice of Allowability dated Aug. 11, 2022, U.S. Appl. No. 17/176,050, filed Feb. 15, 2021.

Notice of Allowance dated Jul. 20, 2022, U.S. Appl. No. 17/176,050, filed Feb. 15, 2021.

Office Action dated Jun. 10, 2022, U.S. Appl. No. 17/176,050, filed Feb. 15, 2021.

International Preliminary Report on Patentability dated Aug. 24, 2023, International Patent Application No. PCT/US2022/016468 filed Feb. 15, 2022.

Office Action dated Jun. 29, 2023, U.S. Appl. No. 17/965,608, filed Oct. 13, 2022.

Notice of Allowance dated Oct. 18, 2023, U.S. Appl. No. 17/965,608, filed Oct. 13, 2022.

International Preliminary Report on Patentability dated Aug. 31, 2023, International Patent Application No. PCT/US2022/017352 filed Feb. 22, 2022.

Office Action dated Mar. 25, 2024, U.S. Appl. No. 17/965,608, filed Oct. 13, 2022.

Rule 161(2) and 162 Communication dated Sep. 27, 2023, European Application No. 22753530.9 filed Sep. 12, 2023.

Rule 161(2) and 162 Communication dated Sep. 29, 2023, European Application No. 22710228.2 filed Sep. 12, 2023.

\* cited by examiner

GAS REFORMER FOR PRODUCING HYDROGEN

CROSS-REFERENCES TO RELATED APPLICATIONS

This application claims the benefit of U.S. Provisional Application No. 63/151,867, filed on Feb. 22, 2021, and entitled "IMPROVED NATURAL GAS FED STEAM METHANE REFORMER (SMR) BASED HYDROGEN PLANT", which is incorporated herein by reference in its entirety for all purposes.

TECHNICAL FIELD

The present disclosure relates to processes for reforming to produce hydrogen gas and optionally generating electricity.

BACKGROUND

Currently, a majority of the hydrogen production is accomplished using natural gas. Carbon dioxide ($CO_2$) can be present as part of the natural gas fed to the hydrogen production plant, and $CO_2$ will also be generated within the plant (e.g., in a unit where reforming and water gas shift occur). Because carbon dioxide ($CO_2$) is the main greenhouse gas that is targeted for reduction by various governments and various emissions programs, there is an ongoing need for the development of techniques for reducing carbon dioxide emissions and improving energy production for such manufacturing plants.

BRIEF DESCRIPTION OF THE DRAWINGS

The following figures illustrate embodiments of the subject matter disclosed herein. The claimed subject matter may be understood by reference to the following description taken in conjunction with the accompanying figures, in which:

DESCRIPTION

Figure 1:
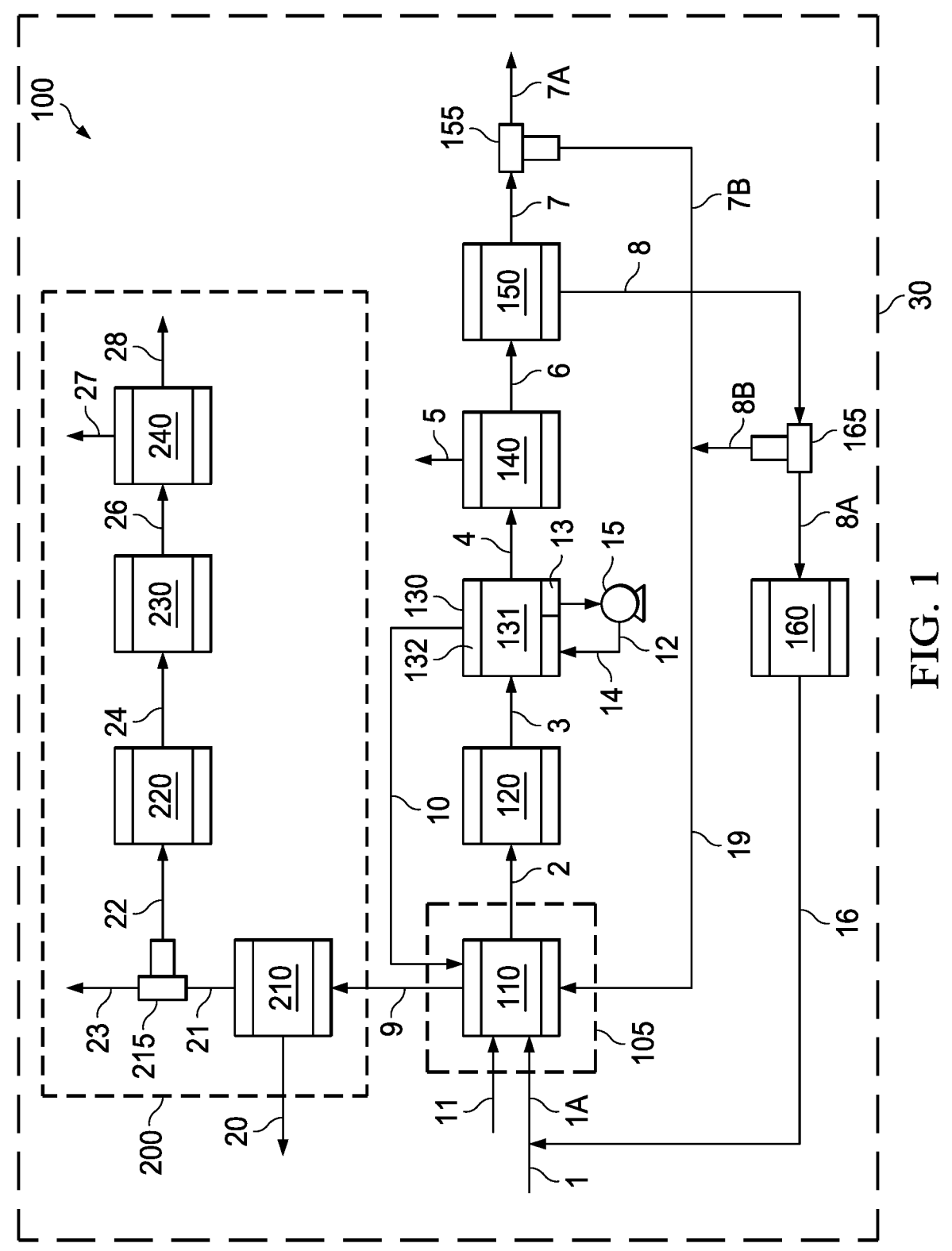
FIG. 1 illustrates a process and an apparatus for reforming to produce hydrogen.

It should be understood at the outset that although an illustrative implementation of one or more embodiments are provided below, the disclosed process and apparatus may be implemented using any number of techniques, whether currently known or in existence. The disclosure should in no way be limited to the illustrative implementations, drawings, and techniques illustrated hereinbelow, including the exemplary designs and implementations illustrated and described herein, but may be modified within the scope of the appended claims along with their full scope of equivalents. Thus, while multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

The recitation of ranges of values herein is merely intended to serve as a shorthand method of referring individually to each separate value falling within the range. Unless otherwise indicated herein, each individual value is incorporated into the specification as if it were individually recited herein. All processes described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosed subject matter otherwise claimed. No language in the specification should be construed as indicating any non-claimed element essential to the practice of the disclosed subject matter.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified.

The following discussion provides many exemplary embodiments of the disclosed subject matter. Although each embodiment may represent a single combination of disclosed elements, the disclosed subject matter is considered to include all possible combinations of the disclosed elements. Thus, if one embodiment comprises elements A, B, and C, and a second embodiment comprises elements B and D, then the disclosed subject matter is also considered to include other remaining combinations of A, B, C, or D, even if not explicitly disclosed.

While the following terms are believed to be well understood by one of ordinary skill in the art, the following definitions are set forth to facilitate explanation of the presently disclosed subject matter. Unless defined otherwise, all technical and scientific terms used herein have the same meaning as commonly understood to one of ordinary skill in the art to which the presently disclosed subject matter belongs.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, the terms "comprise," "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures preceded by "comprises [ . . . ] a" does not, without more constraints, preclude the existence of other devices or other sub-systems or other elements or other structures or additional devices or additional sub-systems or additional elements or additional structures.

Reference throughout this specification to "one embodiment," "an embodiment," or similar language means that a particular feature, structure, or characteristic described in connection with the embodiment is included in at least one embodiment of the present disclosure. Thus, appearances of the phrase "in one embodiment," "in an embodiment," and similar language throughout this detailed description may, but do not necessarily, all refer to the same embodiment. Disclosed herein are processes and systems for reforming to produce hydrogen that has cost effective carbon capture and optionally electricity generation. To accomplish this, typically a natural gas is reformed to produce hydrogen and carbon dioxide that is removed in a pre-combustion context, in that, the processes and systems separate carbon dioxide from a shifted syngas, and use a hydrogen enriched recycle stream that is derived from i) combining a portion of the off-gas from pressure swing adsorption of the shifted syngas and a portion of the hydrogen product from pressure swing adsorption or ii) combining a portion of the off-gas from pressure swing adsorption of the shifted syngas and a hydrogen permeate from a membrane unit that filters the permeate from a portion of the shifted syngas (after $CO_2$ removal), for use as fuel for combustion in a steam methane reformer. In both cases, this fuel which is enriched in hydrogen, and thus uses more hydrogen for combustion in the steam methane reformer, replaces amounts of natural gas fuel that would otherwise create carbon dioxide upon combustion. The pre-combustion context is relative to carbon dioxide removal in a post-combustion context, e.g., where carbon dioxide is removed from the flue gas emitted from a steam methane reformer, after combustion of fuel in the steam methane reformer. The disclosed processes and systems have further improved carbon capture when optionally using the post-combustion carbon dioxide removal technique disclosed herein, which separates carbon dioxide from the flue gas emitted by the steam methane reformer or generated by an autothermal reformer. In addition, additional energy requirements can be reduced by generating electricity with at a portion of the produced hydrogen.

In the pre-combustion context disclosed herein, separation of carbon dioxide from the shifted syngas reduces the amount of carbon dioxide in the off-gas of the pressure swing adsorption (PSA) unit that is fed as fuel to the steam methane reformer. This means that when using a portion of the PSA off-gas as fuel as disclosed herein, the carbon dioxide is present in off-gas recycle only in residual amounts (compared to no carbon dioxide recovery), so the heat duty of the steam methane reformer needed for heating carbon dioxide in addition to other components is reduced, which reduces the fuel needed to heat a reformer 105, in this embodiment a steam methane reformer 110, to maintain operating temperature. Moreover, the carbon dioxide that would be passed through to the flue gas of the steam methane reformer is reduced to residual amounts since greater amounts of hydrogen are used for fuel in place of hydrocarbon fuel such as natural gas.

Using the hydrogen enriched recycle stream as fuel in place of a hydrocarbon fuel reduces the amount of carbon dioxide generated due to fuel combustion because a smaller amount of hydrocarbon fuel is used. Combustion of hydrogen produces no carbon dioxide; thus, the flue gas that flows from the steam methane reformer contains less carbon dioxide (compared with using hydrocarbon-based fuels). The hydrogen enriched recycle stream can contain greater than 50 mol % hydrogen. Carbon dioxide that can be generated by other components of the off-gas in the steam methane reformer, and any carbon dioxide residually contained in the PSA off-gas that passes through the steam methane reformer, can flow from the steam methane reformer in the flue gas and optionally be captured from the flue gas by an optional flue gas treatment system. Carbon capture according to the process described herein can be improved over existing techniques to be in a range of from about 70% to about 95%.

FIG. 1 illustrates a process and apparatus 100 for producing hydrogen from natural gas in a hydrocarbon manufacturing plant 30. The system 100 for carrying out the process in FIG. 1 generally includes a steam methane reformer 110; a water gas shift unit 120; a shifted syngas cooling unit 130; an absorption unit 140; a pressure swing adsorption (PSA) unit 150; a splitter 155; a compressor 160; and a splitter 165, the equipment being connected for the steam flow as shown in FIG. 1. The system 100 can optionally include the flue gas treatment system 200, which can include a cooling unit 210, a splitter 215, a compression unit 220, a carbon dioxide recovery unit 230, and a pressure swing adsorption (PSA) unit 240. The system 200 can produce a $N_2$ product 28 of high purity for plant use and an $O_2$ product 27 suitable for introduction to the steam methane reformer 110. As will be appreciated by one of skill in the art, and with the help of this disclosure, components of the hydrogen production system 100 can be in fluid communication with each other through any suitable conduits (e.g., pipes, streams, etc.). For example, reference numeral 8 can be referred to tail gas 8, off-gas 8, off-gas stream 8, off-gas line 8, or off-gas conduit 8.

The process for producing hydrogen from natural gas in FIG. 1 can include introducing a feed gas 1A, a feed steam 10 and/or 11, and a fuel 19 to a steam methane reformer 110 to produce unshifted synthesis gas (syngas) 2; introducing the unshifted syngas 2 to a water gas shift unit 120 to produce a shifted syngas 3; optionally cooling the shifted syngas 3 in a heat exchanger 130 to remove an aqueous condensate 12 from the shifted syngas 3, producing a cooled shifted syngas 4; removing $CO_2$ from the shifted syngas 3/4 to produce a $CO_2$ depleted syngas 6 and a $CO_2$ product 5; introducing the $CO_2$ depleted syngas 6 to a pressure swing adsorption unit 150 to produce a hydrogen product 7 and an off-gas 8 comprising carbon monoxide, carbon dioxide, unreacted methane, and hydrogen; and one or more of:

a. splitting the hydrogen product 7 into a first hydrogen portion 7A and a second hydrogen portion 7B; and introducing the second hydrogen portion 7B to the steam methane reformer 110;

b. splitting the off-gas 8 into a first off-gas portion 8A and a second off-gas portion 8B; compressing the first off-gas portion 8A to form a compressed off-gas 16; introducing the compressed off-gas 16 to the steam methane reformer 110;

c. splitting the off-gas 8 into a first off-gas portion 8A and a second off-gas portion 8B; combining the second off-gas portion 8B with the second hydrogen portion 7B to form the fuel 19;

d. wherein a feed natural gas 1 and the first off-gas portion 8A/16 are combined to form the feed gas 1A before being introduced to the steam methane reformer 110.

Figure 2:
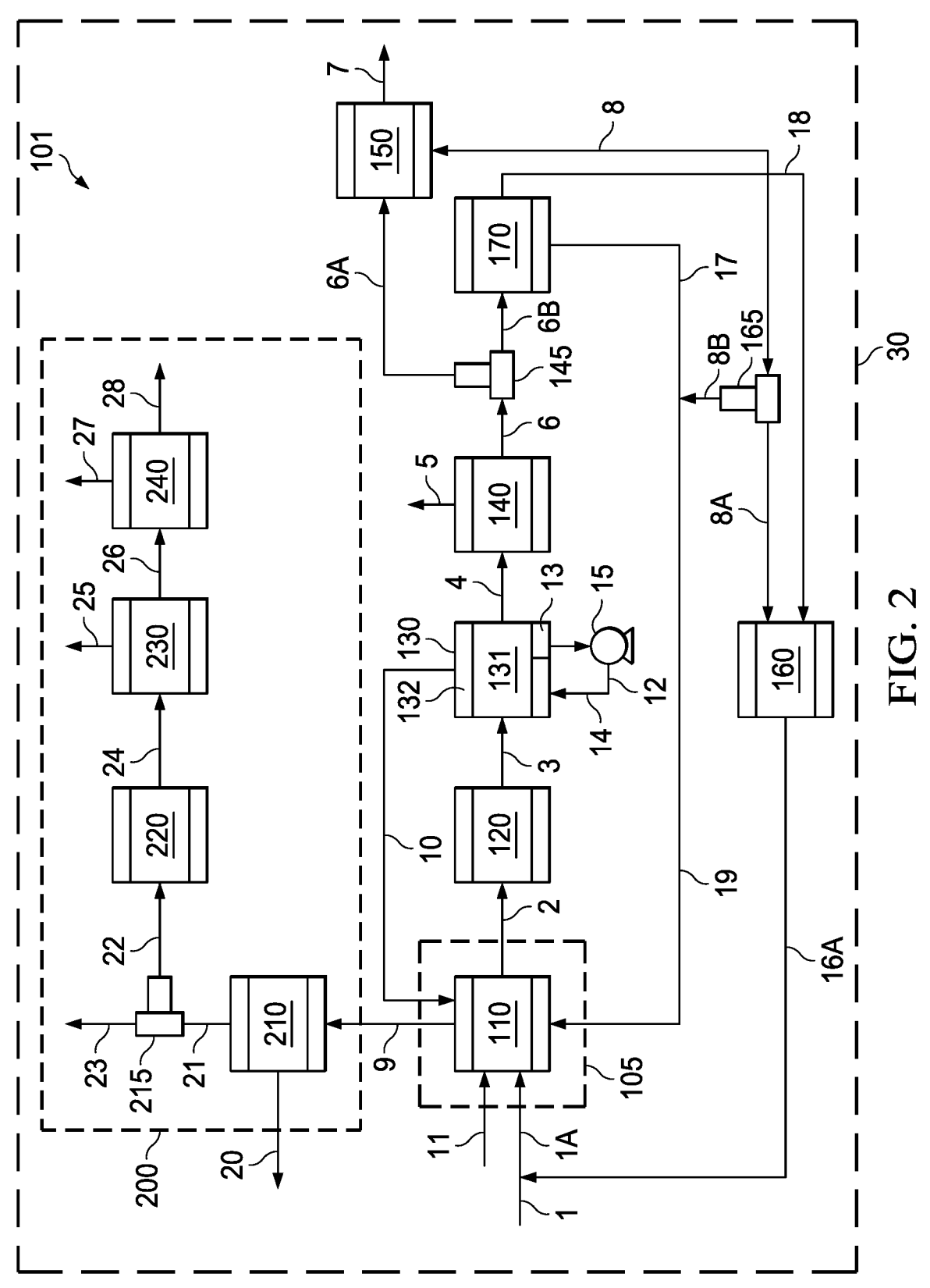
FIG. 2 illustrates another process and apparatus for reforming to produce hydrogen.

FIG. 2 illustrates another process and apparatus 101 for producing hydrogen from natural gas in a hydrocarbon manufacturing plant 30. The apparatus 101 for carrying out the process in FIG. 2 generally includes the reformer 105, such as the steam methane reformer 110; the water gas shift unit 120; the shifted syngas cooling unit 130; the absorption unit 140; the pressure swing adsorption (PSA) unit 150; the compressor 160; and a membrane unit 170; the equipment being connected for the stream flow as shown in FIG. 2. The apparatus 101 can optionally include the flue gas treatment system 200, which can include the cooling unit 210, the compression unit 220, the carbon dioxide recovery unit 230, and the pressure swing adsorption (PSA) unit 240. As will be appreciated by one of skill in the art, and with the help of this disclosure, components of the hydrogen production apparatus 101, as well as apparatuses 100, 102, and 103, can be in fluid communication with each other through any suitable conduits (e.g., pipes, streams, etc.). For example, reference numeral 8 can be referred to off-gas 8, off-gas stream 8, off-gas line 8, or off-gas conduit 8.

The process for producing hydrogen from natural gas in FIG. 2 can include introducing a feed natural gas 1/1A, a feed steam 10 and/or 11, and a fuel 19 to a steam methane reformer 110 to produce unshifted synthesis gas (syngas) 2; introducing the unshifted syngas 2 to a water gas shift unit 120 to produce a shifted syngas 3; optionally cooling the shifted syngas 3 in a heat exchanger 130 to remove an aqueous condensate 12 from the shifted syngas 3, producing a cooled shifted syngas 4; removing $CO_2$ from the shifted syngas 3/4 to produce a $CO_2$ depleted syngas 6 and a $CO_2$ product 5; and one or more of:

a. splitting the $CO_2$ depleted syngas 6 into a first $CO_2$ depleted syngas portion 6A and a second $CO_2$ depleted syngas portion 6B;

i. introducing the first $CO_2$ depleted syngas portion 6A to a pressure swing adsorption unit 150 to produce a hydrogen product 7 and an off-gas 8 comprising carbon monoxide, carbon dioxide, unreacted methane, and hydrogen;

ii. introducing the second $CO_2$ depleted syngas portion 6B to a membrane unit 170 to produce a hydrogen permeate 17 and a retentate 18; and introducing the retentate 18 to the steam methane reformer 110, wherein the retentate 18 is optionally compressed in compressor 160 before introduction to the steam methane reformer 110;

b. splitting the off-gas 8 into a first off-gas portion 8A and a second off-gas portion 8B;

c. compressing the first off-gas portion 8A and the retentate 18 in a compressor 160 to form a feed recycle 16A; and introducing the feed recycle 16A to the steam methane reformer 110;

d. wherein a feed natural gas 1 is combined with the feed recycle 16A to form the feed gas 1A before being introduced to the steam methane reformer 110.

The processes above can optionally include removing the aqueous condensate 12 from a shifted syngas side 131 of the heat exchanger 130; introducing the aqueous condensate 12 to a coolant side 132 of the heat exchanger 130; and producing a heat exchanger steam in the heat exchanger 130, wherein the heat exchanger steam is the feed steam 10 that is introduced to the steam methane reformer 110 to avoid the requirement of using boiler feed water and treating the condensate from the heat exchanger 130 thereby reducing energy usage.

The processes above can optionally include cooling the flue gas 9 in the heat exchanger 210 to produce a cooled flue gas in the stream 21 and an aqueous condensate 20, splitting the cooled (dried) flue gas in the stream 21 into a first portion in the stream 22 and a second portion in the stream 23; compressing the first portion in a compressor 220 to produce a compressed first portion in the stream 24; removing $CO_2$ from the compressed first portion in the stream 24; sequestering the carbon dioxide product in the $CO_2$ product stream 25 or sending the carbon dioxide product in the $CO_2$ product stream 25 to storage or a pipeline for transport, for example, for use in enhanced oil recovery; optionally removing $O_2$ from the $CO_2$ depleted flue gas in the stream 26 by pressure swing adsorption to produce a $N_2$ product 27.

The above processes and systems 100 and 101 can have a carbon capture of about 70% without use of the flue gas treatment system 200. When used in conjunction with the flue gas treatment process and apparatus 101 having carbon dioxide removal, where a splitter 215 can be adjusted to control how much flue gas flows to another absorption unit 230 for carbon dioxide removal from the flue gas, the carbon recovery of the combined process and apparatus can range from about 70% to about 95%. The flue gas treatment process and apparatus 101 can also include another pressure swing adsorption unit 240 to produce an $O_2$ product 27 and a $N_2$ product 28. The $O_2$ product 27 recovered by the flue gas treatment process and apparatus 101 can be fed to the steam methane reformer 110. The $N_2$ product 28 can be have nitrogen purity suitable for use in another part of the plant where the processes and systems disclosed herein are located.

Referring to FIGS. 1 and 2 in more detail, in the pre-combustion context disclosed herein, separation of carbon dioxide from the shifted syngas reduces the amount of carbon dioxide in the off-gas of the pressure swing adsorption (PSA) unit that is fed as fuel to the steam methane reformer. This means that when using PSA off-gas as fuel as disclosed herein, the carbon dioxide is present in off-gas recycle only in residual amounts (compared to no carbon dioxide recovery), so the heat duty of the steam methane reformer 110 needed for heating carbon dioxide in addition to other components is reduced, which reduces the fuel needed to heat the steam methane reformer 110 to maintain operating temperature. Moreover, the carbon dioxide that would be passed through to the flue gas of the steam methane reformer is reduced to residual amounts.

Using the hydrogen rich stream (hydrogen enriched PSA off-gas) as fuel in place of a hydrocarbon fuel reduces the amount of carbon dioxide generated due to fuel combustion because a smaller amount of hydrocarbon fuel is used. Combustion of hydrogen produces no carbon dioxide; thus, the flue gas that flows from the steam methane reformer contains less carbon dioxide (compared with using hydrocarbon-based fuels). The off-gas of the PSA unit can contain greater than 50 mol % hydrogen. Carbon dioxide that can be generated by other components of the off-gas in the steam methane reformer, and any carbon dioxide residually contained in the PSA off-gas that passes through the steam methane reformer, can flow from the steam methane reformed in the flue gas and optionally be captured from the flue gas by a flue gas treatment system. Carbon capture according to the process described herein can be improved over existing techniques to be in a range of from about 60% to about 95%.

The process described herein can be implemented using the system 100 of FIG. 1. The system 100 includes the steam methane reformer 110; the water gas shift unit 120; the shifted syngas cooling unit 130; the absorption unit 140; and the pressure swing adsorption (PSA) unit 150. The system 100 can optionally include the flue gas treatment system 200 in FIG. 2. In FIG. 2, the flue gas treatment system 200 can include the cooling unit 210, a compression unit 220, a carbon dioxide recovery unit 230, and a pressure swing adsorption (PSA) unit 240. As will be appreciated by one of skill in the art, and with the help of this disclosure, components of the hydrogen production system can be in fluid communication with each other through any suitable conduits (e.g., pipes, streams, etc.).

The process of FIG. 1 can include introducing natural gas and steam to the steam methane reformer 110 to produce an unshifted synthesis gas (syngas).

In aspects, the natural gas in the stream 1 (also applicable to process and apparatuses 101, 102, and 103 described below) provided to the reformer 105 can include methane and one or more of $C_2$+ hydrocarbons (e.g., ethane, propane, butanes, pentanes, or combinations thereof), nitrogen, carbon dioxide, and contaminants (e.g., sulfur-containing compounds, chlorides, water vapor, or combinations thereof). It is contemplated that the natural gas in the stream 1 can be pre-treated to remove sulfur-containing compounds (e.g., hydrogen sulfide, carbon sulfide, carbonyl sulfide, carbon disulfide, organic sulfur compounds, or combinations thereof) to a level acceptable to avoid poisoning of the catalyst in the steam methane reformer 110. In aspects, the concentration of contaminants in the stream 1 is less than about 1 part per million volume (ppmv), alternatively less than about 0.5 ppmv, or alternatively less than about 0.1 ppmv. In some aspects, the concentration of sulfur-containing compounds in the stream 1 is less than about 1 part per million volume (ppmv), alternatively less than about 0.5 ppmv, or alternatively less than about 0.1 ppmv. In some aspects, the concentration of hydrogen sulfide in the stream 1 is less than about 1 part per million volume (ppmv), alternatively less than about 0.5 ppmv, or alternatively less than about 0.1 ppmv.

In aspects, steam can be introduced into the steam methane reformer 110 via the stream 11, via the stream 10, and optionally via the stream 1. In an embodiment, a molar ratio of steam to methane in the total feed streams to the steam methane reformer 110 can be from about 0.5:1 to about 4.0:1, alternatively from about 0.75:1 to about 3.0:1, or alternatively from about 0.8:1 to about 2.5:1. In an embodiment, a molar ratio of steam to methane in the total feed streams to the steam methane reformer 110 can be from about 0.5:1 to about 1.0:1, alternatively from about 0.6:1 to about 0.9:1, or alternatively from about 0.65:1 to about 0.85:1, for a sulfur passivated nickel-based catalyst in the steam methane reformer 110. In an embodiment, a molar ratio of steam to methane in the total feed streams to the steam methane reformer 110 can be from about 2.5:1 to about 4.0:1, alternatively from about 2.75:1 to about 3.75:1, or alternatively from about 3.0:1 to about 3.5:1, for a sulfur sensitive nickel-based catalyst in the steam methane reformer 110.

In an embodiment, a molar ratio of carbon dioxide to methane in the total feed streams to the steam methane reformer 110 can be from about 0.5:1 to about 1.5:1, alternatively from about 0.5:1 to about 1.0:1, or alternatively from about 1.0:1 to about 1.5:1. In an embodiment, a process of producing fuel from carbon dioxide avoids separating the carbon dioxide from the natural gas prior to introducing the natural gas to the steam methane reformer 110. In an embodiment, a process of producing fuel from carbon dioxide excludes separating at least a portion of the carbon dioxide from the natural gas prior to introducing the natural gas to the steam methane reformer 110. Generally, in conventional reforming processes, at least a portion of the carbon dioxide can be separated (e.g., removed) from a feedstock introduced to a reforming unit, as the carbon dioxide lowers the molar ratio of hydrogen to carbon monoxide. Carbon dioxide can be converted to carbon monoxide in the presence of hydrogen, according to the general reaction $CO_2+H_2 \leftrightarrows CO+H_2O$. In an embodiment, the steam methane reformer 110 as disclosed herein can employ carbon dioxide as part of a feedstock introduced to the steam methane reformer 110 (when compared to conventional steam reforming processes), in order to produce a syngas (e.g., unshifted syngas) having a molar ratio of hydrogen to carbon monoxide of about 2:1. Converting carbon dioxide to carbon monoxide lowers the molar ratio of hydrogen to carbon monoxide both by consuming hydrogen and producing carbon monoxide. Further, the presence of carbon dioxide can lead to an additional methane reforming reaction as represented by the general reaction $CH_4+CO_2 \leftrightarrows 2CO+2H_2$, which in turn can lower the molar ratio of hydrogen to carbon monoxide in the syngas (e.g., unshifted syngas) by producing hydrogen and carbon monoxide in equimolar amounts.

The steam methane reformer 110 can include one or more vessels containing a catalyst. The steam methane reformer 110 can generally include a reaction side and a heating side, wherein heat derived from combustion of a fuel on the heating side is used to supply heat on the reaction side where the methane reforming reaction occurs. For example, a vessel for the steam methane reformer 110 can contain one or more tubes loaded with catalyst, where the interior of the tubes is the reaction side of the steam methane reformer 110, and each tube is fluidly connected with streams 1, 2, and 11; while, the outer surface of the tubes is considered to be on the heating side of the steam methane reformer 110 and is subjected to heat generated from combustion of a fuel that is fed to and combusted on the heating side of the steam methane reformer 110.

The steam methane reformer 110 is configured to contact the feed natural gas receive via the stream 1 with the catalyst to produce the unshifted syngas (e.g., on the reforming reaction side of the steam methane reformer 110). In embodiments, the catalyst of the steam methane reformer 110 can include a sulfur passivated nickel-based catalyst. Methane can be reformed (e.g., converted to syngas or unshifted syngas) in the presence of water (e.g., steam) according to the general reaction $CH_4+H_2O \leftrightarrows CO+3H_2$. The CO made in the reaction can also be converted to $CO_2$ in the steam methane reformer 110, by the reaction in the presence of water (e.g., steam) according to the general reaction $CO+H_2O \leftrightarrows CO_2+H_2$. Conventional steam methane reformers use a steam to methane molar ratio of from about 2.5:1 to about 4.0:1, resulting in a syngas with a molar ratio of hydrogen to carbon monoxide of about 3:1, or higher. In an embodiment, the steam methane reformer 110 as disclosed herein can employ a low steam to methane ratio of 0.5 to 2.0 (when compared to conventional steam reforming processes) due to the presence of $CO_2$ in the feed gas, in order to produce a syngas (e.g., unshifted syngas) having a molar ratio of hydrogen to carbon monoxide of about 2:1.

In an embodiment, the steam methane reformer 110 can comprise any suitable reactor, such as for example a tubular reactor, a multitubular reactor, and the like, or combinations thereof. In an embodiment, the steam methane reformer 110 can comprise a MIDREX reformer, which is commercially available from Midrex Technologies, Inc. of Charlotte, North Carolina. In an embodiment, the steam methane reformer 110 can have a nickel-based catalyst (e.g., sulfur sensitive nickel-based catalyst) and/or a sulfur passivated nickel-based catalyst (to avoid carbon depositions) contained therein. Methane reforming (according to the general reaction $CH_4+H_2O \leftrightarrows CO+3H_2$) is strongly endothermic, and a reaction rate depends on the temperature, pressure and catalyst type. Methane will undergo the reforming reaction at high temperatures; however, in the presence of a catalyst (e.g., nickel-based catalyst), the temperature at which methane can be reformed can be lowered. In an embodiment, the steam methane reformer 110 can comprise one or more catalyst filled tubes (e.g., nickel-based catalyst filled tubes). In an embodiment, methane reforming can take place in catalyst filled tubes (e.g., nickel-based catalyst filled tubes). In such embodiment, the catalyst filled tubes can be heated indirectly, such as for example by burning a steam methane reformer fuel inside a reactor (e.g., fire box, furnace, etc.) comprising the catalyst filled tubes (e.g., a tube-filled furnace).

In aspects of this disclosure, the fuel includes the off-gas of the pressure swing adsorption unit 150 in the apparatus 100 (via the stream 8 from the PSA unit 150, discussed in more detail below). When embodied as the off-gas from the PSA unit 150, the steam methane reformer fuel can include carbon monoxide, carbon dioxide, methane, hydrogen, and water vapor. In additional or alternative aspects, the off-gas stream 8 of the pressure swing adsorption unit 150 is the only fuel stream that is fed to the steam methane reformer 110 during steady state operation (e.g., the fuel to the steam methane reformer 110 consists of the off-gas from the pressure swing adsorption unit 150).

In aspects, the amount of hydrogen in the steam methane reformer fuel that is fed to the steam methane reformer 110 can be greater than 30, 35, 40, 45, or 50 mol % based on a total moles of components in the fuel that is fed to the steam methane reformer 110. In additional aspects, the amount of carbon dioxide in the steam methane reformer fuel (e.g., in off-gas stream) can be less than 60, 55, 50, 45, 40, 35, 30, 25, 20, 15, 10, 5, 4, or 3 mol % based on a total moles of components in the fuel that is fed to the steam methane reformer 110. In additional aspects, the amount of methane (e.g., in the form of unreacted methane passing through the system 100 to the off-gas of the PSA unit 150) in the steam methane reformer fuel that is fed to the steam methane reformer 110 can be greater than 10, 15, 20, 25, 30, 35, or 40 mol % based on a total moles of components in the fuel that is fed to the steam methane reformer 110.

In some aspects, it should be understood that a natural gas fuel may be used to startup the steam methane reformer 110 during startup of the system 100; however, upon reaching steady state with the improved hydrogen and carbon dioxide concentrations in the off-gas stream 8 of the pressure swing adsorption unit 150, the natural gas fuel may be discontinued for steady state operation, and the hydrogen in the off-gas stream 8 can supply the needed fuel for the steam methane reformer 110, thereby minimize carbon venting from the process and apparatus 100.

In an embodiment, a flue gas can be emitted from the steam methane reformer 110, wherein the flue gas includes combustion products generated by combustion of the fuel that is fed to the steam methane reformer 110, such as carbon dioxide and water vapor. The steam methane reformer fuel can be burned at a bottom of the steam methane reformer 110, and the flue gas stream 9 can be vented or emitted at the top of the steam methane reformer 110, wherein furnace tubes filled with catalyst are dispersed within the furnace vessel between fuel burners and the flue gas vent/outlet stream 9. As will be appreciated by one of skill in the art with the help of this disclosure, the fuel burning (e.g., burner flames) and the fuel combustion products do not contact directly the feed natural gas travelling through and reforming within the catalyst filled tubes (e.g., nickel-based catalyst filled tubes). That is, the steam methane reformer fuel burns inside the steam methane reformer 110 and outside the catalyst filled tubes where the reformation reactions occur, and the fuel combustion products travel through the steam methane reformer 110 and along an outer surface of the catalyst filled tubes towards the outlet for the flue gas, which is emitted in the flue gas stream 9.

In an embodiment, the feed components of natural gas and steam can be introduced to the one or more catalyst filled tubes (e.g., nickel-based catalyst filled tubes), wherein the catalyst filled tubes are indirectly heated by burning a fuel, and as the natural gas and steam travel along the catalyst filled tubes, methane can be reformed to produce hydrogen and carbon monoxide, and the unshifted syngas comprising hydrogen and carbon monoxide can be collected as it exits the catalyst filled tubes.

In an embodiment, the steam methane reformer 110 can be characterized by a reforming temperature of from about 800° C. to about 900° C., alternatively from about 800° C. to about 850° C., or alternatively from about 850° C. to about 900° C. In an embodiment, the steam methane reformer 110 can be characterized by a reforming pressure of from about 1 bar to about 30 bars, alternatively from about 20 bars to about 30 bars, alternatively from about 1 bar to about 10 bars, alternatively from about 1.5 bars to about 8 bars, or alternatively from about 2 bars to about 5 bars.

While FIG. 1 shows that the streams 1 and 11 are fed separately to the steam methane reformer 110, it is contemplated that the steam in the stream 11 can be combined with the natural gas in the stream 1 prior to being fed to the steam methane reformer 110, such that a water saturated natural gas is fed to the steam methane reformer 110. The contents of the streams 1 and 11 can be combined in a saturator unit prior to feeding the water saturated natural gas to the steam methane reformer 110, or can be combined by joining the piping of the streams 1 and 11 at a piping joint prior to feeding to the steam methane reformer 110 in a common conduit or pipe.

In aspects, the unshifted syngas can be contained in the stream 2. The unshifted syngas can include hydrogen, carbon monoxide, and optionally: carbon dioxide, methane (e.g., unreacted methane, unreformed methane), sulfur-containing compounds in case of passivated reformer catalyst (e.g., hydrogen sulfide, carbon sulfide, carbonyl sulfide, carbon disulfide, organic sulfur compounds, etc.), chlorides, steam, or a combination thereof.

In some embodiments, the unshifted syngas can be characterized by a molar ratio of hydrogen to carbon monoxide of from about 1.7:1 to about 2.5:1, alternatively from about 1.8:1 to about 2.3:1, or alternatively from about 1.9:1 to about 2.1:1, for example if a reformer including a sulfur passivated nickel-based catalyst is used, such as a new reformer. In an embodiment, the unshifted syngas can have a molar ratio of hydrogen to carbon monoxide of about 2:1. In other embodiments, the unshifted syngas can be characterized by a molar ratio of hydrogen to carbon monoxide of from about 3:1 to about 4:1, for example if a reformer comprising a sulfur sensitive nickel-based catalyst is used, such as an existing reformer.

In some embodiments, the unshifted syngas can include carbon dioxide in an amount of less than about 20 mole % (mol %), alternatively less than about 10 mol %, or alternatively less than about 5 mol %, for example if a reformer including a sulfur passivated nickel-based catalyst is used, such as a new reformer. In other embodiments, the unshifted syngas can include carbon dioxide in an amount of less than about 50 mol %, for example if a reformer including a sulfur sensitive nickel-based catalyst is used, such as an existing reformer (e.g., conventional reformer).

In an embodiment, the unshifted syngas can include methane (e.g., unreacted methane, unreformed methane) in an amount of less than about 5 mol %, alternatively less than about 2.5 mol %, alternatively less than about 2 mol %, or alternatively less than about 1 mol %.

In other embodiments, the unshifted syngas can include sulfur-containing compounds in an amount of less than about 1 ppmv. As will be appreciated by one of skill in the art, and with the help of this disclosure, a portion of syngas contaminants (e.g., sulfur-containing compounds, chlorides, etc.) can be in a gas state in the syngas, and a portion of the contaminants can be dissolved in the water present in the syngas.

In some embodiments, the unshifted syngas can have a pressure of from about 5 pounds per square inch gauge (psig) to about 50 psig, for example if a reformer including a sulfur passivated nickel-based catalyst is used, such as a new reformer. In other embodiments, the unshifted syngas can have a pressure of from about 300 psig to about 500 psig, for example if a reformer including a sulfur sensitive nickel-based catalyst is used, such as an existing reformer.

The process can further include introducing the unshifted syngas (e.g., via the stream 2) to a water gas shift unit 120 to produce a shifted syngas (e.g., in the stream 3). In embodiments, the shifted syngas comprises hydrogen, carbon monoxide, and carbon dioxide. The molar ratio of hydrogen to carbon monoxide in the unshifted syngas can be increased (e.g., adjusted) by introducing the unshifted syngas to a water gas shift unit 120 comprising a sour shift catalyst to convert carbon monoxide and water into additional hydrogen and carbon dioxide according to the general reaction $CO+H_2O \leftrightarrow H_2+CO_2$, also known as the water-gas shift (WGS) reaction. The WGS reaction can be conducted in the presence of a variety of sour shift catalysts at a WGS reaction temperature of from about 204.4° C. to about 482.2° C., alternatively from about 232.2° C. to about 454.5° C., or alternatively from about 260° C. to about 426.7° C. The WGS reaction does not change the total number of moles (e.g., two moles of products are produced from two moles of reactants), and as such an effect of pressure on the WGS reaction is minimal. The equilibrium of the WGS reaction can be shifted towards hydrogen production in the presence of high moisture content. Generally, excess moisture can be present in the unshifted syngas that is recovered from the reformer, and such moisture is usually sufficient to drive the WGS reaction to achieve a desired molar ratio of hydrogen to carbon monoxide. In an embodiment, steam can be further introduced to the water gas shift unit 120 to increase the moisture content.

In some embodiments, the unshifted syngas can be heated to a temperature that is greater than a syngas moisture saturation temperature by from about 11.1° C. to about 41.7° C., alternatively from about 13.8° C. to about 33.3° C., or alternatively from about 16.6° C. to about 27.8° C., prior to introducing the unshifted syngas to the water gas shift unit 120. As will be appreciated by one of skill in the art with the help of this disclosure, if the temperature of the unshifted syngas is too low, the water could condense inside the water gas shift unit 120 and such water condensation could damage a sour shift catalyst. The syngas moisture saturation temperature can be from about 176.6° C. to about 260° C., depending on the unshifted syngas composition and process conditions for producing the unshifted syngas.

In an embodiment, the water gas shift unit 120 can comprise any suitable reactor, such as for example a fixed bed reactor, an adiabatic reactor, a radial reactor, and the like, or combinations thereof. In an embodiment, a water gas shift reactor can comprise a catalyst bed comprising a sour shift catalyst in sulfur that is present in the feed syngas. In an embodiment, the water gas shift unit 120 can be a multi-stage unit, for example the water gas shift unit 120 can comprise multiple reactors and/or multiple fixed beds.

The WGS reaction can be catalyzed by both metals and metal oxides. Non-limiting examples of sour shift catalysts suitable for use include cobalt, molybdenum, copper, iron, a cobalt-molybdenum catalyst, a chromium promoted iron-based catalyst, a copper promoted iron-based catalyst, a copper-zinc-aluminum catalyst, copper oxide (CuO), iron oxide ($Fe_2O_3$), oxides thereof, and the like, or combinations thereof. Sweet shift catalysts are generally iron based.

In an embodiment, a molar ratio of hydrogen to carbon monoxide in the shifted syngas can be greater than a molar ratio of hydrogen to carbon monoxide in the unshifted syngas. In an embodiment, the shifted syngas can be characterized by a molar ratio of hydrogen to carbon monoxide of equal to or greater than about 100:1, alternatively from about 5:1 to about 100:1, alternatively from about 10:1 to about 75:1, or alternatively from about 15:1 to about 40:1. As will be appreciated by one of skill in the art, and with the help of this disclosure, the molar ratio of hydrogen to carbon monoxide depends on shifting (e.g., CO conversion via the WGS reaction) conditions (e.g., type of WGS unit, type of catalyst used in the WGS unit, etc.). Further, as will be appreciated by one of skill in the art, and with the help of this disclosure, full shifting (e.g., almost all CO undergoes the WGS reaction) can lead to hydrogen to carbon monoxide molar ratios of over 10:1 due to very small CO numbers; single stage, mild shifting can lead to hydrogen to carbon monoxide molar ratios of from about 5:1 to about 10:1; a more moderate level of full shift can lead to hydrogen to carbon monoxide molar ratios of about 7:1; and the hydrogen to carbon monoxide molar ratio decreases with catalyst age.

In an embodiment, an amount of carbon dioxide in the shifted syngas can be greater than an amount of carbon dioxide in the unshifted syngas. As will be appreciated by one of skill in the art, and with the help of this disclosure, carbon dioxide is produced in equimolar amounts with hydrogen via the WGS reaction. In aspects, the shifted syngas in the stream 3 also contains unreacted steam.

The process can further include cooling the shifted syngas in the heat exchanger 130 to remove an aqueous condensate from the shifted syngas. The heat exchanger 130 is configured as a cross-exchanger, where one side of the heat exchanger 130 is the shifted syngas side 131, and the other side of the heat exchanger 130 contains the coolant that cools the shifted syngas and is the coolant side 132. The shifted syngas side 131 of the heat exchanger 130 is configured to receive the shifted syngas on the shifted syngas, cool the shifted syngas such that water condenses to form an aqueous condensate on the shifted syngas side 131. The cooled shifted syngas exits the shifted syngas side 131 of the heat exchanger 130 in the stream 4.

FIG. 1 shows a coolant stream 12 having an end 13 coupled to the shifted syngas side 131 of the heat exchanger 130 and an opposite end 14 coupled to the coolant side 132 of the heat exchanger 130. The coolant stream 12 is configured to remove the aqueous condensate from the shifted syngas side 131 of the heat exchanger 130 and to introduce the aqueous condensate to the coolant side 132 of the heat exchanger 130. A pump 15 can be included in the coolant stream 12 to facilitate flow of the aqueous condensate from the shifted syngas side 131 of the heat exchanger 130 to the coolant side 132 of the heat exchanger 130. The coolant side 132 of the heat exchanger 130 is configured receive the aqueous condensate, and to heat the aqueous condensate to produce a heat exchanger steam. The heat exchanger steam can exit the coolant side 132 of the heat exchanger 130 via the stream 10, and the heat exchanger steam can be fed to the steam methane reformer 110. The coolant stream 12 can be configured to remove the aqueous condensate from the shifted syngas side 131 of the heat exchanger 130 and to introduce the aqueous condensate to the coolant side 132 of the heat exchanger 130. The heat exchanger 130 can be configured to heat the aqueous condensate to produce a heat exchanger steam, wherein the heat exchanger steam is fed to the steam methane reformer 110 via the stream 10 that is connected to both the heat exchanger 130 and the steam methane reformer 110. The steam generated by the heat exchanger 130 can be characterized as a dirty steam that includes dissolved carbon dioxide and ammonia, and other impurities formed in the process and apparatus 100. However, the steam (e.g., dirty steam) is suitable for feeding to the steam methane reformer 110 and can replace fresh plant steam; thus, reducing the need for cost and supply of fresh steam to the process and apparatus 100. Moreover, the steam in the stream 10 does not need to be treated and can flow without treatment from the heat exchanger 130 to the steam methane reformer 110.

With this configuration of the cooling unit 130, the process can further include removing the aqueous condensate from the shifted syngas side 131 of the heat exchanger 130, introducing the aqueous condensate to the coolant side 132 of the heat exchanger 130, and producing the heat exchanger steam in the heat exchanger 130.

In some aspects, the heat exchanger steam in the stream 10 can be the feed steam that is introduced to the steam methane reformer 110, and there is no need for steam in the stream 11 during steady state operation of the system 100. In such aspects, steam in the stream 11 may be supplied to the steam methane reformer 110 on startup of the system 100.

The process can further include removing $CO_2$ from the shifted syngas to produce a $CO_2$ product and a $CO_2$ depleted syngas. The process generally utilizes the absorption unit 140 as illustrated in FIG. 1, to receive the cooled shifted syngas in the stream 4, to remove $CO_2$ from the shifted syngas to produce the $CO_2$ product in the stream 5 and the $CO_2$ depleted syngas in the stream 6.

Removing $CO_2$ from the shifted syngas (e.g., the cooled shifted syngas) can include absorbing $CO_2$ with a lean physical solvent to produce the $CO_2$ depleted syngas and a $CO_2$ enriched physical solvent, and flashing the $CO_2$ enriched physical solvent to produce the $CO_2$ product and the lean physical solvent. Flashing does not require a stripper, so there is no steam needed to remove $CO_2$ when using a physical solvent. Moreover, using a physical solvent allows for the equipment in the absorption unit to be made of carbon steel (not made of any stainless steel).

Alternatively, removing $CO_2$ from the shifted syngas (e.g., the cooled shifted syngas) can include absorbing $CO_2$ with a lean amine solvent to produce the $CO_2$ depleted syngas and a $CO_2$ enriched amine solvent, and stripping the $CO_2$ enriched amine solvent to produce the $CO_2$ product and the lean amine solvent or other $CO_2$ removal technologies.

In an embodiment, the absorption unit 140 includes an absorber and a regenerator, where at least a portion of the carbon dioxide can be removed (e.g., recovered, separated, etc.) from at least a portion of the cooled shifted syngas by a physical solvent or a chemical solvent in the absorber.

Examples of physical solvents useful in the absorption unit 140 include methanol, propylene carbonate, N-methylpyrrolidone, a glycol ether, ethers of polyglycols (e.g., dimethoxytetraethylene glycol or N-substituted morpholine), or a combination thereof. In an embodiment, the absorption solvent can include a Fluor Solvent system including or consisting of a propylene carbonate solvent, available from Fluor Corporation of Irving, Texas.

Examples of chemical solvent useful in the absorption unit 140 include primary amines, secondary amines, tertiary amines, sterically hindered amines, methylethylamine (MEA), methyl diethanolamine (MDEA), diglycolamine (DGA), 2-amino-2-methyl-1-propanol (AMP), or a combination thereof.

The chemical solvent or physical solvent absorbs the carbon dioxide while the remaining components of the cooled shifted syngas pass through the absorber to form the $CO_2$ depleted syngas in the stream 6. The carbon dioxide in the $CO_2$ enriched solvent leaves the absorber and is fed to a regenerator, where the carbon dioxide is separated from the solvent (the solvent is regenerated) to produce a lean solvent (e.g., a lean physical solvent or a lean chemical solvent) and a $CO_2$ product. The lean solvent can be recycled to the absorber, and the $CO_2$ product is recovered in the stream 5 of FIG. 1. In an embodiment, the absorber can comprise any suitable absorber column, wherein a gas phase (e.g., the cooled shifted syngas) interacts with a liquid phase (e.g., absorption solvent) via co-current flow, counter-current flow, or cross-flow. Generally, absorption columns can be vertical and cylindrical columns or towers. In an embodiment, the absorber can include a countercurrent absorber column, wherein the shifted syngas can be introduced to the column countercurrent (e.g., opposing flow directions) with respect to the flow of absorption solvent. In an embodiment, the absorption solvent can be introduced as a downflow at the top of the absorber, and the shifted syngas can be introduced (e.g., bubbled) at the bottom of the absorber. In such embodiment, the $CO_2$ depleted syngas can be recovered at the top of the absorber, and the $CO_2$ enriched solvent can be recovered at the bottom of the absorber. The absorber can have one or more trays and/or packing as a contacting device. However, any other suitable contacting devices can be employed, such as for example static or dynamic mixers, spargers, impellers, etc. In some embodiments, the absorption unit 140 can include a packed bed column, a tray column, a spray column, a falling film column, a bubble column, a sparged tank column, and the like, or combinations thereof. In an embodiment, the absorber can operate at a pressure of from about 375 psig to about 575 psig, alternatively from about 400 psig to about 550 psig, or alternatively from about 450 psig to about 500 psig.

In aspects where the absorption solvent is a physical solvent, the regenerator can be embodied as a flash tank or flash column configured to remove the carbon dioxide from the $CO_2$ rich physical solvent by pressure reduction, i.e., flashing (e.g., via pressure reduction) the carbon dioxide out of the physical solvent. In aspects, the flash tank can include any suitable vessel, wherein a gas phase (e.g., the carbon dioxide) is flashed by differential pressure from the liquid phase (e.g., the $CO_2$ enriched solvent). Generally, the flash tank can be any vessel configured to subject the $CO_2$ enriched solvent to a drop in pressure such that the carbon dioxide is liberated from the liquid solvent to form the lean physical solvent. A pressure in the flash tank is generally lower than a pressure in the absorber to enable the carbon dioxide to flash from $CO_2$ enriched solvent to produce the lean physical solvent and the $CO_2$ product in the stream 5. In an embodiment, the flash tank can operate at a pressure in a range of from a vacuum pressure to about 200 psig (1.38 MPag). In some embodiments, the flash tank is one or more vessels (e.g., more than one flash tank) connected in series such that the reduction in pressure is accomplished in stages. In the system 100, the absorption unit 140 can include an absorber having a lean physical solvent configured to absorb carbon dioxide from the shifted syngas to produce a $CO_2$ enriched solvent and the $CO_2$ depleted syngas in the stream 6. The absorption unit 140 can also include a flash tank coupled to the absorber, wherein the flash tank is configured to receive the $CO_2$ enriched solvent from the absorber and to flash carbon dioxide from the $CO_2$ enriched solvent to produce the lean physical solvent and the $CO_2$ product in the stream 5. Alternatively, the absorption unit 140 in the system 100 can include an absorber having a lean chemical solvent configured to absorb carbon dioxide from the shifted syngas to produce a $CO_2$ enriched solvent and the $CO_2$ depleted syngas in the stream 6, and a stripper coupled to the absorber, wherein the stripper is configured to receive the $CO_2$ enriched solvent from the absorber and to strip carbon dioxide from the $CO_2$ enriched solvent to produce the lean chemical solvent and the $CO_2$ product in the stream 5.

In aspects where the absorption solvent is a chemical solvent, the regenerator can be embodied as a stripper configured to use a stripping gas to remove the carbon dioxide from the chemical solvent. The stripper can include a reboiler that provides heat to the stripper for removing carbon dioxide from the chemical solvent to produce the lean chemical solvent. In aspects, the stripper can comprise any suitable stripping column, wherein a gas phase (e.g., the carbon dioxide) is removed from the liquid phase (e.g., the $CO_2$ enriched solvent). Generally, the stripper can be similar in configuration to the absorber, while operating at different parameters (e.g., pressure, temperature, etc.). A pressure in the stripper can be lower than a pressure in the absorber and a temperature in the stripper can be higher than a temperature in the absorber, to enable the $CO_2$ enriched solvent to release carbon dioxide. Generally, the stripper can be one or more vertical and cylindrical columns or towers. In an embodiment, the $CO_2$ enriched solvent can be introduced as a downflow at the top of the stripper, and a portion of the lean solvent can be re-introduced at the bottom (e.g., bubbled) of the stripper as vapor (e.g., using a reboiler). In such embodiment, carbon dioxide can be recovered at the top of the stripper, and the lean solvent can be recovered at the bottom of the stripper. Generally, a reboiler for the stripper can be heated with steam (e.g., low pressure steam at a pressure of from about 400 kPa to about 1,500 kPa), wherein the steam can be recovered from the reboiler as an aqueous condensate, and wherein the recovered aqueous condensate can be further converted into the steam used for heating the reboiler. In some embodiments, the stripper can include a packed bed column, a tray column, a spray column, a falling film column, a bubble column, a sparged tank column, and the like, or combinations thereof. In an embodiment, the stripper can operate at a pressure of from about 5 psig to about 50 psig, alternatively from about 10 psig to about 45 psig, alternatively from about 20 psig to about 40 psig, alternatively from about 25 psig to about 35 psig, or alternatively from about 25 psig to about 30 psig.

In aspects, the $CO_2$ depleted syngas in the stream 6 can comprise substantially all of the hydrogen present in the cooled shifted syngas in the stream 4. In an embodiment, the $CO_2$ depleted syngas can contain equal to or greater than about 50 mol %, alternatively equal to or greater than about 60 mol %, alternatively equal to or greater than about 60 mol %, alternatively equal to or greater than about 80 mol %, alternatively equal to or greater than about 90 mol %, alternatively equal to or greater than about 95 mol %, or alternatively equal to or greater than about 99 mol % of the hydrogen of the cooled shifted syngas.

In aspects, the $CO_2$ enriched solvent can comprise carbon dioxide in an amount of equal to or greater than about 30 mol %, alternatively equal to or greater than about 40 mol %, or alternatively equal to or greater than about 50 mol % of the carbon dioxide of the cooled shifted syngas.

In an embodiment, the process can include sequestering the carbon dioxide product in the $CO_2$ product stream 5. In an embodiment, the carbon dioxide product in the stream 5 can comprise substantially all of the carbon dioxide of the cooled shifted syngas in the stream 4. In some embodiments, the carbon dioxide product can include equal to or greater than about 99 mol %, alternatively equal to or greater than about 99.5 mol %, alternatively equal to or greater than about 99.9 mol %, or alternatively equal to or greater than about 99.99 mol % of the carbon dioxide of the cooled shifted syngas in the stream 4. Alternatively, the process can include sending the carbon dioxide product in the $CO_2$ product stream 5 to storage or a pipeline for transport, for example, for use in enhanced oil recovery.

The process can further include introducing the $CO_2$ depleted syngas (e.g., via the stream 6) to a pressure swing adsorption (PSA) unit 150 to produce a hydrogen product (e.g., in the stream 7) and an off-gas (e.g., in the stream 8). The off-gas in the stream 8 can include carbon monoxide, carbon dioxide, methane, and hydrogen. The methane in the off-gas can be unreacted methane that was fed to, but not converted to syngas in, the steam methane reformer 110. The carbon dioxide in the off-gas stream 8 can be residual carbon dioxide that was not removed in the absorption unit 140. The hydrogen in the off-gas stream 8 is hydrogen that is produced in the process, and as described in more detail below, the off-gas stream 8 is coupled to the steam methane reformer 110, and the PSA 150 is operated such that a larger amount of hydrogen is present in the off-gas stream 8 such that the off-gas stream 8 can function as the only fuel source for the steam methane reformer 110.

In an embodiment, the PSA unit 150 comprises an adsorbent material. Non-limiting examples of adsorbent materials suitable for use in the present disclosure include molecular sieves, zeolites, such as 5A zeolite and 13X zeolite, and the like, or combinations thereof. Pressure swing adsorption (PSA) is generally based on physical binding of gas molecules (e.g., hydrogen, methane, carbon dioxide, etc.) to an adsorbent material (e.g., a solid). Binding strength between the gas molecules and the adsorbent material depends on the gas components, type of adsorbent material, partial pressures of the gas components and operating temperature. Purifying a gas by the PSA separation is based on differences in binding strength of the gas components to the adsorbent material. Highly volatile components with low polarity, such as hydrogen, are practically non-adsorbable, as opposed to molecules like methane and carbon dioxide. The PSA generally has an adsorption step, and a desorption step. During the adsorption step, high purity hydrogen can be recovered from the PSA unit 150, as hydrogen will not be adsorbed. Methane and carbon dioxide will be adsorbed by the adsorbent material, and can be recovered during the desorption step.

Although not wanting to be bound by theory, the PSA works at basically constant temperature and uses the effect of alternating pressure and partial pressure to perform the adsorption step and the desorption step. Because heating or cooling is not required, short cycles within the range of minutes can be achieved. A cycle can be defined as the time between the start of two consecutive adsorption steps. The adsorption is carried out at high pressure, until an equilibrium loading is reached, wherein no further adsorption capacity is available and the adsorbent material must be regenerated. The desorption step can be done by lowering the pressure to slightly above atmospheric pressure resulting in a respective decrease in equilibrium loading. As a result, the gases (e.g., methane, carbon dioxide) that were adsorbed by the adsorbent material are desorbed and the adsorbent material is regenerated. Once the desorption step is completed, the pressure is increased back to adsorption pressure level and another adsorption step begins. Generally, the PSA also involves a purge step between the desorption step and the adsorption step, to ensure that the adsorber material is ready to undergo the next adsorption step.

In an embodiment, the $CO_2$ depleted syngas can be introduced to the PSA unit at the bottom, and can travel upwards through the adsorbent material, wherein hydrogen can be recovered at a top of the PSA unit during the adsorption step. In such embodiment, the PSA off-gas including methane and carbon dioxide can be recovered at the bottom of the PSA unit during the desorption step.

In an embodiment, the PSA unit 150 comprises from about 2 to about 10 PSA units, alternatively from about 3 to about 8 PSA units, alternatively from about 3 to about 6 PSA units operating in parallel, to provide a continuous supply of hydrogen, and to provide for a continuous uptake of $CO_2$ depleted syngas. Once an adsorption step is completed in the PSA unit 150, and such unit starts a desorption step, another PSA unit can take over the adsorption step to ensure a continuous process. As will be appreciated by one of skill in the art, and with the help of this disclosure, more than the one PSA unit can undergo the adsorption step at the same time, and similarly, more than the one PSA unit can undergo the desorption step at the same time. As long as there is always a PSA unit undergoing an adsorption step and/or ready to undergo an adsorption step, hydrogen production can be continuous.

In an embodiment, the hydrogen in hydrogen product stream 7 can be characterized as a blue hydrogen because while methane is in the feed to the steam methane reformer 110, the carbon dioxide produced in the process and apparatus 100 is captured for subsequent use or storage or sequestration. In aspects, the purity of hydrogen in the stream 7 can be equal to or greater than about 99 mol %, alternatively equal to or greater than about 99.9 mol %, or alternatively equal to or greater than about 99.99 mol % based on a number of moles of components in the stream 7.

In an embodiment, the hydrogen in hydrogen product stream 7 can be characterized by a pressure of from about 375 psig to about 575 psig, alternatively from about 400 psig to about 550 psig, or alternatively from about 450 psig to about 500 psig. As will be appreciated by one of skill in the art, and with the help of this disclosure, the hydrogen can have about the same pressure as the pressure used for the adsorption step.

In an embodiment, the PSA off-gas in the stream 8 can be characterized by a pressure of from about 5 psig to about 50 psig, alternatively from about 10 psig to about 45 psig, alternatively from about 20 psig to about 40 psig, alternatively from about 25 psig to about 35 psig, or alternatively from about 25 psig to about 30 psig.

In an embodiment, the PSA off-gas can further comprise hydrogen (e.g., residual hydrogen). Residual hydrogen in the PSA off-gas can usually come from hydrogen that remains in the PSA unit once the adsorption step is finished, and such residual hydrogen is recovered in the PSA off-gas during the desorption step.

In accordance with this disclosure, the PSA off-gas in the stream 8 can be used as fuel for heating the steam methane reformer 110. In an aspect, the PSA off-gas is the only fuel used for heating the steam methane reformer 110. The methane and elevated amount of hydrogen (compared with traditional off-gas streams) from the PSA off-gas in the stream 8 can combust in the steam methane reformer 110 to provide heat for the endothermic reforming reactions taking place in the steam methane reformer 110 reformer, and the flue gas emitted from the steam methane reformer 110 in the stream 9 can include water vapor and carbon dioxide from such combustion, as well as excess oxygen and nitrogen.

In aspects, the off-gas in the stream 8 comprises at least 25, 30, 35, 40, 45, or 50 mol % hydrogen based on a total moles of components in the off-gas. In additional or alternative aspects, the off-gas stream 8 is the only source of fuel fed to the steam methane reformer 110, and the off-gas in the stream 8 (the fuel for the steam methane reformer 110) comprises at least 25, 30, 35, 40, 45, or 50 mol % hydrogen based on a total moles of fuel introduced to the steam methane reformer 110. In additional or alternative aspects, the off-gas in the stream 8 contains less than 60, 55, 50, 45, 40, 35, 30, 25, 20, 15, 10, 5, 4, or 3 mol % carbon dioxide based on a total moles of components in the off-gas. In additional or alternative aspects, the off-gas is the only source of fuel fed to the steam methane reformer 110, and the off-gas in the stream 8 (the fuel for the steam methane reformer 110) includes less than 60, 55, 50, 45, 40, 35, 30, 25, 20, 15, 10, 5, 4, or 3 mol % carbon dioxide based on a total moles of fuel introduced to the steam methane reformer 110.

A flue gas treatment process can be implemented using the flue gas treatment apparatus 200. The flue gas treatment process and apparatus 200 can be used in combination with the process and apparatus 100 of FIG. 1, as well as the processes and apparatuses 101, 102, and 103 of FIGS. 2-4. The flue gas treatment system 200 can include the cooling unit 210, the compression unit 220, the carbon dioxide recovery unit or absorption unit 230, and the pressure swing adsorption (PSA) unit 240. As will be appreciated by one of skill in the art, and with the help of this disclosure, components of the hydrogen production system can be in fluid communication with each other through any suitable conduits (e.g., pipes, streams, etc.).

Generally, the steam methane reformer 110 of the process and apparatus 100 produces a flue gas that is in flue gas stream 9. The process that is implemented by the apparatus 200 includes receiving the flue gas in flue gas stream 9 in a heat exchanger 210. The flue gas can generally include oxygen, nitrogen, water vapor, and carbon dioxide.

The process also includes cooling the flue gas in the heat exchanger 210 to produce a cooled flue gas in the stream 21. The heat exchanger 210 can be any heat exchanger configured to cool the flue gas in preparation for removing carbon dioxide as disclosed herein. In some aspects, cooling the flue gas can condense water to produce an aqueous condensate in the stream 20. In such aspects, the cooled flue gas in the stream 21 is a dried flue gas. In some further aspects, the aqueous condensate in the stream 20 can be reused, such as fed to another area of the plant that contains the processes and apparatuses 100, 101, 102 and 103, or the stream 20 can be heated and fed as steam to the steam methane reformer 110, additionally reducing the need for fresh steam to the steam methane reformer 110.

The process can further include splitting the cooled (dried) flue gas in the stream 21 into a first portion in the stream 22 and a second portion in the stream 23. The splitting can be accomplished with a splitter 215 that is configured to connect to the stream 21 and streams 22 and 23. The flow of the first portion of the cooled (dried) flue gas in the stream 22 can be from about 1 vol % to about 50 vol % of the flow of cooled (dried) flue gas in the cooled flue gas stream 21, with the balance flowing in the second portion in the stream 23. The second portion can include greater than 90 vol % of the nitrogen in the flue gas on a dry basis. In aspects, the carbon capture of the process and apparatus 101 in combination with carbon capture of process and apparatus 100 can range from about 60% to about 95%, depending on the flow split in the streams 22 and 23 (0% flow in the stream 22=about 60% and 100% flow in the stream 22=about 95%). For example, a flow of zero in the stream 22 would amount to a carbon capture equal to that of the process and apparatus 100 (about 60%) because the carbon dioxide in the flue gas would flow from the process and apparatus 101 in the stream 23. On the other hand, a flow split of 100% in the stream 22 (0% in the stream 3) would increase the carbon capture to about 95%. The relationship of split to carbon capture is linear between the endpoint of 0%:about 60% to 100%: about 95%.

The process can further include compressing the first portion in the compressor 220 to produce a compressed first portion in the stream 24. The compressor 220 can be embodied as any compressor suitable for cooling gases that include carbon dioxide.

The process can additionally include removing $CO_2$ from the compressed first portion in the stream 24. The $CO_2$ removal can be accomplished by amine-based absorption in the absorption unit 230 to produce a residual $CO_2$ in the stream 25 and a $CO_2$ depleted flue gas in the stream 26. Amine-based absorption involves using an absorber followed by a stripper, and a chemical solvent to absorb carbon dioxide. Examples of chemical solvent useful in the absorption unit 230 include primary amines, secondary amines, tertiary amines, sterically hindered amines, methylethylamine (MEA), methyl diethanolamine (MDEA), diglycolamine (DGA), 2-amino-2-methyl-1-propanol (AMP), or a combination thereof. The chemical solvent absorbs the carbon dioxide while the remaining components of the compressed flue gas pass through the absorber to form the $CO_2$ depleted flue gas in the stream 26. The carbon dioxide in the $CO_2$ enriched solvent leaves the absorber and is fed to a regenerator, where the carbon dioxide is separated from the solvent (the solvent is regenerated) to produce a lean solvent (e.g., a lean chemical solvent) and a $CO_2$ product in the stream 25. The lean solvent can be recycled to the absorber, and the $CO_2$ product is recovered in the stream 25 of FIG. 2. In an embodiment, the absorber can comprise any suitable absorber column, wherein a gas phase (e.g., the compressed flue gas) interacts with a liquid phase (e.g., absorption solvent) via co-current flow, counter-current flow, or cross-flow. Generally, absorption columns can be vertical and cylindrical columns or towers. In an embodiment, the absorber can comprise a countercurrent absorber column, wherein the compressed flue gas can be introduced to the column countercurrent (e.g., opposing flow directions) with respect to the flow of absorption solvent. In an embodiment, the absorption solvent can be introduced as a downflow at the top of the absorber, and the compressed flue gas can be introduced (e.g., bubbled) at the bottom of the absorber. In such embodiment, the $CO_2$ depleted flue gas can be recovered at the top of the absorber, and the $CO_2$ enriched solvent can be recovered at the bottom of the absorber. The absorber can have one or more trays and/or packing as a contacting device. However, any other suitable contacting devices can be employed, such as for example static or dynamic mixers, spargers, impellers, etc. In some embodiments, the absorption unit 230 can comprise a packed bed column, a tray column, a spray column, a falling film column, a bubble column, a sparged tank column, and the like, or combinations thereof. In an embodiment, the absorber can operate at a pressure of from about 375 psig to about 575 psig, alternatively from about 400 psig to about 550 psig, or alternatively from about 450 psig to about 500 psig.

The stripper of the absorption unit 230 can be configured to use a stripping gas to remove the carbon dioxide from the chemical solvent. The stripper can include a reboiler that provides heat to the stripper for removing carbon dioxide from the chemical solvent to produce the lean chemical solvent. In aspects, the stripper can comprise any suitable stripping column, wherein a gas phase (e.g., the carbon dioxide) is removed from the liquid phase (e.g., the $CO_2$ enriched solvent). Generally, the stripper can be similar in configuration to the absorber, while operating at different parameters (e.g., pressure, temperature, etc.). A pressure in the stripper can be lower than a pressure in the absorber and a temperature in the stripper can be higher than a temperature in the absorber, to enable the $CO_2$ enriched solvent to release carbon dioxide. Generally, the stripper can be one or more vertical and cylindrical columns or towers. In an embodiment, the $CO_2$ enriched solvent can be introduced as a downflow at the top of the stripper, and a portion of the lean solvent can be re-introduced at the bottom (e.g., bubbled) of the stripper as vapor (e.g., using a reboiler). In such embodiment, carbon dioxide can be recovered at the top of the stripper, and the lean solvent can be recovered at the bottom of the stripper. Generally, a reboiler for the stripper can be heated with steam (e.g., low pressure steam at a pressure of from about 400 kPa to about 1,500 kPa), wherein the steam can be recovered from the reboiler as an aqueous condensate, and wherein the recovered aqueous condensate can be further converted into the steam used for heating the reboiler. In some embodiments, the stripper can comprise a packed bed column, a tray column, a spray column, a falling film column, a bubble column, a sparged tank column, and the like, or combinations thereof. In an embodiment, the stripper can operate at a pressure of from about 5 psig to about 50 psig, alternatively from about 10 psig to about 45 psig, alternatively from about 20 psig to about 40 psig, alternatively from about 25 psig to about 35 psig, or alternatively from about 25 psig to about 30 psig.

In an embodiment, the process can include sequestering the carbon dioxide product in the $CO_2$ product stream 25. In an embodiment, the carbon dioxide product in the stream 25 can comprise substantially all of the carbon dioxide of the first portion of the cooled flue gas in the stream 22. In some embodiments, the carbon dioxide product in the stream 25 can comprise equal to or greater than about 99 mol %, alternatively equal to or greater than about 99.5 mol %, alternatively equal to or greater than about 99.9 mol %, or alternatively equal to or greater than about 99.99 mol % of the carbon dioxide of the first portion of the cooled flue gas in the stream 22. Alternatively, the process can include sending the carbon dioxide product in $CO_2$ product stream 25 to storage or a pipeline for transport, for example, for use in enhanced oil recovery.

Generally, the stream 26 contains oxygen and nitrogen and may be vented to the atmosphere because most of the carbon dioxide in the stream 22 is captured in the stream 25 in the process and apparatus 101 of FIG. 2. In optional aspects, the process can additionally include removing $O_2$ from the $CO_2$ depleted flue gas in the stream 26 by pressure swing adsorption to produce a $N_2$ product. To accomplish this step, a pressure swing adsorption (PSA) unit 240 can be configured to receive $CO_2$ depleted flue gas in the stream 26. To remove oxygen, the process can include introducing the $CO_2$ depleted flue gas (e.g., via the stream 26) to a pressure swing adsorption (PSA) unit 240 to produce an oxygen product (e.g., in the stream 27) and a nitrogen product (e.g., in the stream 28).

In an embodiment, the PSA unit 240 comprises an adsorbent material. Non-limiting examples of adsorbent materials suitable for use include molecular sieves, zeolites, such as 5A zeolite and 13X zeolite, and the like, or combinations thereof.

Pressure swing adsorption (PSA) is generally based on physical binding of gas molecules (e.g., oxygen) to an adsorbent material (e.g., a solid). Binding strength between the gas molecules and the adsorbent material depends on the gas components, type of adsorbent material, partial pressures of the gas components and operating temperature. Purifying a gas by the PSA separation is based on differences in binding strength of the gas components to the adsorbent material. Highly volatile components with low polarity, such as nitrogen, are practically non-adsorbable, as opposed to molecules like oxygen. The PSA generally has an adsorption step, and a desorption step. During the adsorption step, high purity nitrogen can be recovered from the PSA unit 240, as oxygen will not be adsorbed. Oxygen will be adsorbed by the adsorbent material, and can be recovered during the desorption step.

The PSA works at basically constant temperature and uses the effect of alternating pressure and partial pressure to perform the adsorption step and the desorption step. Because heating or cooling is not required, short cycles within the range of minutes can be achieved. A cycle can be defined as the time between the start of two consecutive adsorption steps. The adsorption is carried out at high pressure, until an equilibrium loading is reached, wherein no further adsorption capacity is available and the adsorbent material must be regenerated. The desorption step can be done by lowering the pressure to slightly above atmospheric pressure resulting in a respective decrease in equilibrium loading. As a result, the gases (e.g., oxygen) that were adsorbed by the adsorbent material are desorbed and the adsorbent material is regenerated. Once the desorption step is completed, the pressure is increased back to adsorption pressure level and another adsorption step begins. Generally, the PSA also involves a purge step between the desorption step and the adsorption step, to ensure that the adsorber material is ready to undergo the next adsorption step.

In an embodiment, the $CO_2$ depleted flue gas in the stream 26 can be introduced to the PSA unit at the bottom, and can travel upwards through the adsorbent material, wherein nitrogen can be recovered at a top of the PSA unit during the adsorption step. In such embodiment, the PSA off-gas comprising oxygen can be recovered at the bottom of the PSA unit during the desorption step.

In an embodiment, the PSA unit 240 comprises from about 2 to about 10 PSA units, alternatively from about 3 to about 8 PSA units, alternatively from about 3 to about 6 PSA units operating in parallel, to provide a continuous supply of nitrogen, and to provide for a continuous uptake of $CO_2$ depleted flue gas. Once an adsorption step is completed in the PSA unit 240, and such unit starts a desorption step, another PSA unit can take over the adsorption step to ensure a continuous process. As will be appreciated by one of skill in the art, and with the help of this disclosure, more than the one PSA unit can undergo the adsorption step at the same time, and similarly, more than the one PSA unit can undergo the desorption step at the same time. As long as there is always a PSA unit undergoing an adsorption step and/or ready to undergo an adsorption step, hydrogen production can be continuous.

The flue gas treatment system 200 can include the heat exchanger 210 coupled to the steam methane reformer 110 and configured to receive a flue gas from the steam methane reformer 110 and to cool the flue gas to produce a cooled flue gas. The system 200 can further include the splitter 215 coupled to the heat exchanger and configured to split the cooled flue gas into a first portion in the stream 22 and a second portion in the stream 23. The split ratio of the splitter 215 based on mol flow rate for the first portion in the stream 22 to the second portion in the stream 23 can range from about 1:10 to 1:1; alternatively, 1:10 to 1:5. The system 200 can also include a compressor 220 coupled to the splitter 215 and configured to compress the first portion received from the stream 22 to produce a compressed first portion in the stream 24. The system 200 can also include the absorption unit 230 coupled to the compressor 220 and configured to receive the compressed first portion from the stream 24, contact the first portion with the lean amine-based solvent, and to produce a residual $CO_2$ in the stream 25 and a $CO_2$ depleted flue gas in the stream 6. The system 200 can also include a pressure swing adsorption unit 240 coupled to the absorption unit 230 and configured to receive the $CO_2$ depleted flue gas in the stream 6 from the absorption unit 230, remove $O_2$ from the $CO_2$ depleted flue gas by pressure swing adsorption, and to produce a $N_2$ product in the stream 28. The $O_2$ product can be recovered in the $O_2$ product stream 27. The purity of $N_2$ product in the $N_2$ product stream 28 can be about 95 mol % based on a total moles of components in the stream 28, which makes the $N_2$ product stream 28 suitable for use in the plant where the processes and systems are located. The purity of $O_2$ product in the $O_2$ product stream 27 can be in a range of 40 mol % to 70 mol %, for example about 50 mol %, based on total moles of components in the stream 27.

The process and apparatus 100 can include the steam methane reformer 110 that is configured to contact methane and steam with a catalyst to form an unshifted syngas, the water gas shift unit 120 coupled to the steam methane reformer 110 and configured to receive the unshifted syngas from the steam methane reformer 110 and to produce a shifted syngas, the absorption unit 140 coupled to the water gas shift unit 120 (e.g., via the heat exchanger 130) and configured to receive the shifted syngas, remove carbon dioxide from the shifted syngas, and produce the $CO_2$ depleted syngas and the $CO_2$ product, and the pressure swing adsorption unit 150 coupled to the absorption unit 140, wherein the pressure swing adsorption unit 150 is configured to receive the $CO_2$ depleted syngas from the absorption unit 140 and to produce the hydrogen product and an off-gas. The process and apparatus 100 can additionally include the off-gas stream 8 coupled to the pressure swing adsorption unit 150 and to the steam methane reformer 110, wherein the off-gas stream 8 is configured to receive the off-gas from the pressure swing adsorption unit 150 and to introduce the off-gas to the steam methane reformer 110 as fuel, wherein the off-gas in the off-gas stream 8 includes carbon monoxide, carbon dioxide, unreacted methane, and at least 25 mol % hydrogen based on a total moles of components in the off-gas stream 8.

The system 100 can also include heat exchanger 130 that is coupled to the water gas shift unit 120 and to the steam methane reformer 110. The heat exchanger 130 can be configured to receive the shifted syngas from the water gas shift unit 120, to cool the shifted syngas, to remove an aqueous condensate from the shifted syngas, and to provide the shifted syngas without the aqueous condensate for introduction to the absorption unit 140.

In the process and apparatus 100, the amount of $CO_2$ in the $CO_2$ product (the stream 5) includes greater than 60 mol % of a sum amount that is the amount of $CO_2$ that is introduced into plus the amount of $CO_2$ that is generated in the system. In some aspects, the $O_2$ product stream 27 can be connected to the steam methane reformer 110, and can be configured to feed oxygen to the steam methane reformer 110.

The process and apparatus 100 alone or in combination with the process and apparatus 101 disclosed herein have improved carbon dioxide recovery. Carbon dioxide recovery is defined as the amount of carbon dioxide that is removed from the process and apparatus via a stream that is dedicated for carbon dioxide relative to the amount of carbon dioxide that the introduced to and generated in the same process and apparatus. A conventional hydrogen production system does not recover carbon dioxide; thus, the carbon dioxide ends in a flue gas or vent gas and there are no streams that are dedicated for carbon dioxide recovery. A stream that is dedicated to carbon dioxide recovery (e.g., for carbon dioxide sequestration or for transport or storage to pipeline) can have a concentration of carbon dioxide that is 95, 96, 97, 98, 99, or higher mol % carbon dioxide based on a total moles of components in the stream.

For process and apparatus 100, the stream that is dedicated for carbon dioxide recovery is the stream 5. The carbon dioxide recovery is such that the amount of $CO_2$ in the $CO_2$ product of stream 5 comprises greater than about 60 mol % of a sum amount equaling i) the amount of $CO_2$ that is introduced into the process and apparatus 100 via any of the streams 1 and 11, plus ii) the amount of $CO_2$ that is generated in the process and apparatus 100.

For process and apparatus 100 in combination with process and apparatus 101, the streams that are dedicated for carbon dioxide recovery are the streams 5 and 25. Carbon dioxide recovery is such that a first sum amount that is the amount of $CO_2$ in the $CO_2$ product plus the amount of $CO_2$ in the residual $CO_2$ is in a range of from about 60 mol % to about 95 mol % of a second sum amount that is the amount of $CO_2$ that is introduced into the process and apparatus 100 and 101 plus the amount of $CO_2$ that is generated in the process and apparatus 100 and 101. The exact amount of carbon dioxide recovery can depend on the split ratio of the cooled flue gas stream 21 in the splitter 28. Carbon dioxide recovery increases as the proportion of cooled flue gas in the first portion in the stream 22 increases relative to the proportion of cooled flue gas in the second portion in the stream 23.

Figure 3:
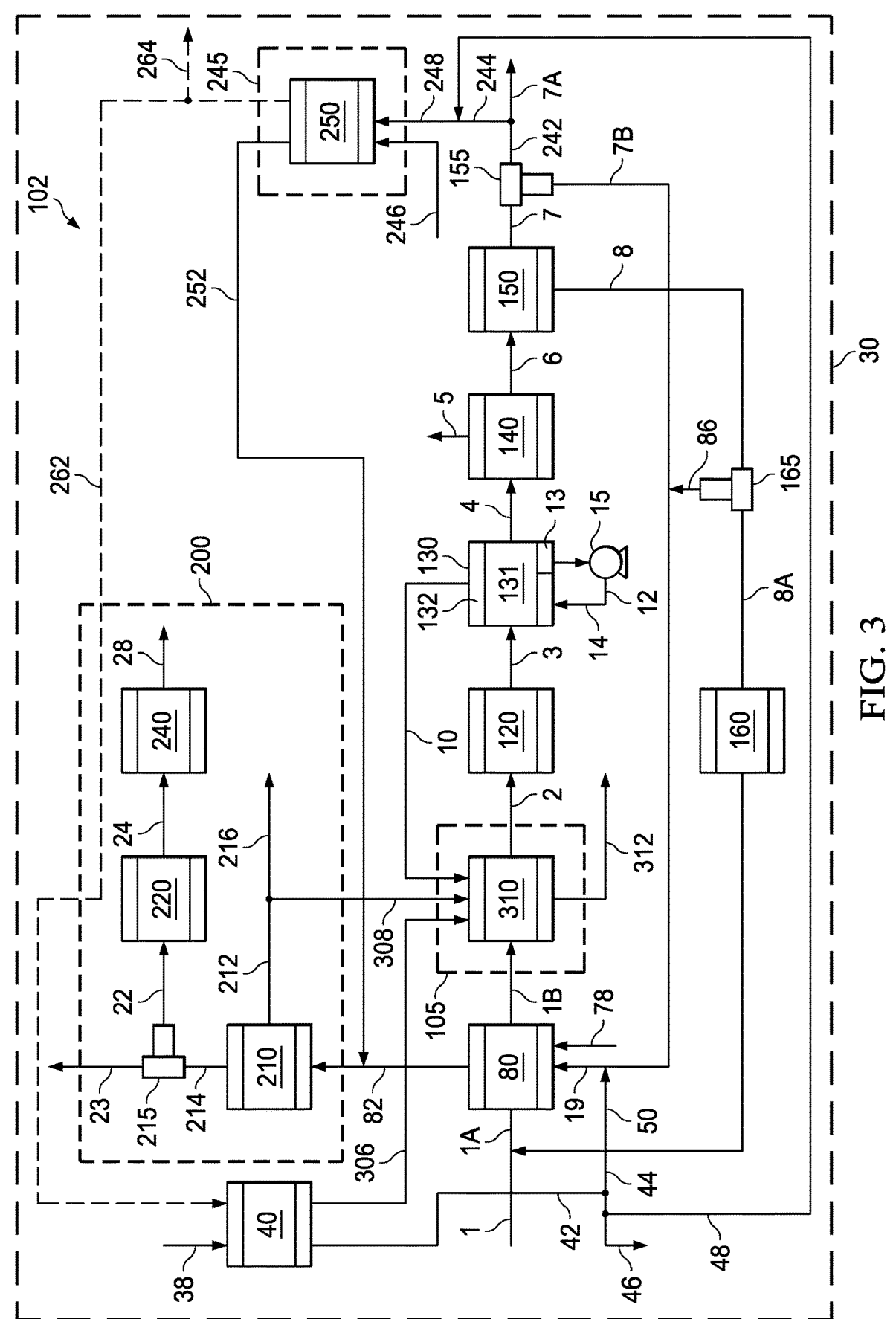
FIG. 3 illustrates yet another process and apparatus for reforming to produce hydrogen.

Referring to FIG. 3, the yet another process and apparatus 102 can include the water gas shift unit 120, the shifted syngas cooling unit 130, the absorption unit 140, the pressure swing adsorption unit 150, and the compressor 160 and can be substantially the same as described above except where noted below. Although the feed or feed gas 1 is described as a natural gas, the feed gas 1 can also include a refinery gas. Alternatively, the feed 1 can include a liquid feed, such as a liquefied petroleum gas or naphtha. Particularly, the feed 1 can include one or more hydrocarbons.

The feed gas 1 can be combined with other streams described herein to form the feed 1A that can be provided to an autothermal preheater 80 prior to sending a heated feed gas 1B to the reformer 105. The autothermal preheater 80, which typically may be a fired heater, can be started with a natural gas fuel 78 that can be shut during steady-state operations. The natural gas fuel 70 may be at a pressure of about 1 bar to about 10 bar, or even about 4 bar, and a temperature of about 100° C. to about 250° C., or even about 175° C. The feed 1 may be mixed with the off-gas 8A, as described above, before entering the autothermal preheater 80 as the feed 1A. Thus, the feed 1A may contain off-gas 8 from the PSA 150 to further reduce overall carbon venting. In one embodiment, the feed 1A may be at a pressure of about 30 bar to about 50 bar, about 35 bar to about 45 bar, or even about 38 bar, and a temperature of about 150° C. to about 300° C., about 200° C. to about 250° C., or even about 210° C. The autothermal preheater 80 may receive the hydrogen portion 7B, as described above, combined with a nitrogen stream 50, as described hereinafter, to form the fuel 19 before entering the autothermal preheater 80. The autothermal preheater 80 can heat the feed 1A to any suitable temperature for autothermal reforming, such as about 400° C. to about 700° C. If hydrogen rich fuel is used, the preheater burners may need to be changed. During preheating, a flue gas stream 82 may be generated and combined with a stream 252, as described hereinafter, prior to being sent to the flue gas treatment system 200, as described above, except that the absorption unit 230 can be omitted. The preheated feed 1B may be at a pressure of about 30 bar to about 50 bar, about 35 bar to about 45 bar, or even about 37 bar or about 38 bar, and a temperature of about 400° C. to about 600° C., about 500° C. to about 600° C., or even about 550° C. and may be sent from the autothermal preheater 80 to the reformer 105, which in this embodiment is an autothermal reformer 310.

In this embodiment, the reformer 105 can be an autothermal reformer 310, although a steam methane reformer or a partial oxidation reformer may be used instead. The autothermal reformer 310 is typically a partial catalytic oxidation reaction operated at any suitable temperature and pressure conditions. As an example, the autothermal reformer 310 may be operated at a temperature of about 400° C. to about 1,100° C. or about 800° C. to about 1,100° C., or a pressure of about 0 psig to about 3,000 psig or about 130 to about 3,000 psig. The feed 7A can be reacted with oxygen over a reforming catalyst to lower temperature and oxygen demand, as compared to partial oxidation absent catalyst. Typically, the reaction produces hydrogen, carbon monoxide, and carbon dioxide to create the unreacted syngas 2. The syngas 2 may be at a pressure of about 25 bar to about 50 bar, about 30 bar to about 40 bar, or even about 34 bar, and a temperature of about 800° C. to about 1,200° C., about 900° C. to about 1,100° C., or even about 1,025° C.

The autothermal reformer 310 may receive oxygen from a stream 306 and water from a stream 308, as described hereinafter, and steam from the stream 10, as described above. In this embodiment, the stream 10 may be a pressure of about 40 bar to about 60 bar, about 45 bar to about 55 bar, or about 48 bar, and a temperature of about 300° C. to about 500° C., about 350° C. to about 450° C., or even about 390° C. Moreover, the autothermal reformer 310 can produce steam 312 by passing the stream 308 through tubes passing through the reaction zone of the autothermal reformer 310. This steam 312 can be used to generate power and reduce the carbon requirements and subsequent carbon venting of the process and system 102.

The unreacted syngas 2 can be converted to the hydrogen product 7 by processing through the water gas shift unit 120; the shifted syngas cooling unit 130; the absorption unit 140; and the PSA unit 150, as described above.

The off-gas 8 from the PSA 150 may be recycled and optionally compressed by passing some of the off-gas 8 past the splitter 165 and combining after compressing with the feed 1, as described above. The another part of the off-gas 86 that is subsequently combined with the hydrogen portion 7B passing through splitter 155 to form a part of the feed 1A, as described above, upstream of the autothermal preheater 80. This recycling and usage of the off-gas 8 can minimize carbon venting from the process and apparatus 102.

The hydrogen product 7 from the PSA 150 can pass through the splitter 155 with the hydrogen portion 7B recycled and the remaining part divided as a hydrogen portion 7A and sent to product store and another hydrogen part 244 being at least a portion 244 of the hydrogen product 7 combined with a stream 48 including nitrogen, as hereinafter described, before entering an electricity generator 245. Optionally, the hydrogen portion 7B being used as fuel can be passed through a hydraulic turbine to at least partially power the PSA 250 compressor, thereby reducing overall carbon venting. In this embodiment, the electricity generator 245 can be a gas turbine 250, such as a hydrogen combined cycle gas turbine. During start-up, the gas turbine 250 may receive a fuel gas 246, that is shuttered during steady-state operations. The gas turbine 250 can be sized to meet the entire electrical demand of the process and apparatus 102, or even the entire hydrocarbon manufacturing plant 30. Particularly, the gas turbine 250 generates electricity 262 that may be provided to an air separation unit 40, as described hereinafter, and optionally provide electricity 264 to the hydrocarbon manufacturing plant 30. The gas turbine 250 produces a flue gas, such as a gas turbine exhaust, in the stream 252. The stream 252 may include nitrogen, oxygen, water, and argon, and be at a pressure of about 1 bar to about 2 bar, or even about 1 bar, and a temperature of about 50° C. to about 150° C., or about 100° C. to about 120° C. that may be combined with the flue gas 82 from the autothermal preheater 80 and processed in the flue gas treatment system 200.

The air separation unit (ASU) 40 receives an air stream 38 and provides oxygen in the stream 306 with a purity of at least about 99.5 percent (%) by volume to the autothermal reformer 310 and nitrogen in a stream 42 with a purity of at least about 99.9% by volume nitrogen or at least about 99.5% by mole nitrogen with remaining being argon. In an embodiment, the stream 42 may have a pressure of about 1 bar to about 50 bar, about 7 bar to about 45 bar, and an ambient temperature, such as about −40° C. to about 50° C., or about 15° C. to about 20° C. Air typically contains, by mole, 78% nitrogen, 21% oxygen, 1% carbon dioxide, and the remaining being argon and other trace elements and/or compounds. The air stream 38 may be about 1 bar and an ambient temperature, such as about −40° C. to about 50° C., or about 15° C. to about 20° C. In an embodiment, the stream 306 may be at least about 98.0, about 99.0, about 99.3, or 99.5 mole percent oxygen with remaining amount including nitrogen and argon. The stream 306 may be at a pressure of about 30 bar to about 60 bar, about 35 bar to about 50 bar, or even about 39 bar or about 46 bar, and a temperature of about 150° C. to about 400° C., about 200° C. to about 300° C., or even about 260° C. The ASU 40 can be any suitable unit using cryogenic fractional distillation, one or more membranes, pressure swing adsorption, or vacuum pressure swing adsorption, to separate oxygen from nitrogen in the air 38. The stream 306 including oxygen can be provided to the autothermal reformer 310. The stream 42 may be split into the streams 44 and 50. The stream 44 is further split into a stream 46 sent to other units and the stream 48 that can be combined with the stream 244 to form an inlet airflow 248 upstream to the gas turbine 250 to control nitrous oxides.

The inlet airflow 248 may be a mixture of nitrogen and hydrogen and be at a pressure of about 10 bar to about 50 bar, about 20 bar to about 40 bar, or even about 26 bar, and an ambient temperature, such as about −40° C. to about 50° C., or about 15° C. to about 20° C. The stream 50 can be blended with the hydrogen portion 7B to control the content of the stream 19 prior to fueling the autothermal preheater 80. Thus, the fuel for the autothermal preheater 80 can be obtained from the stream 50 including nitrogen, the hydrogen product 7 and the off-gas 8 from the PSA 150 to reduce natural gas consumption, and thereby reducing carbon dioxide output. Thus, the process and apparatus 102 can provide a carbon capture of at least about 95%.

Figure 4:
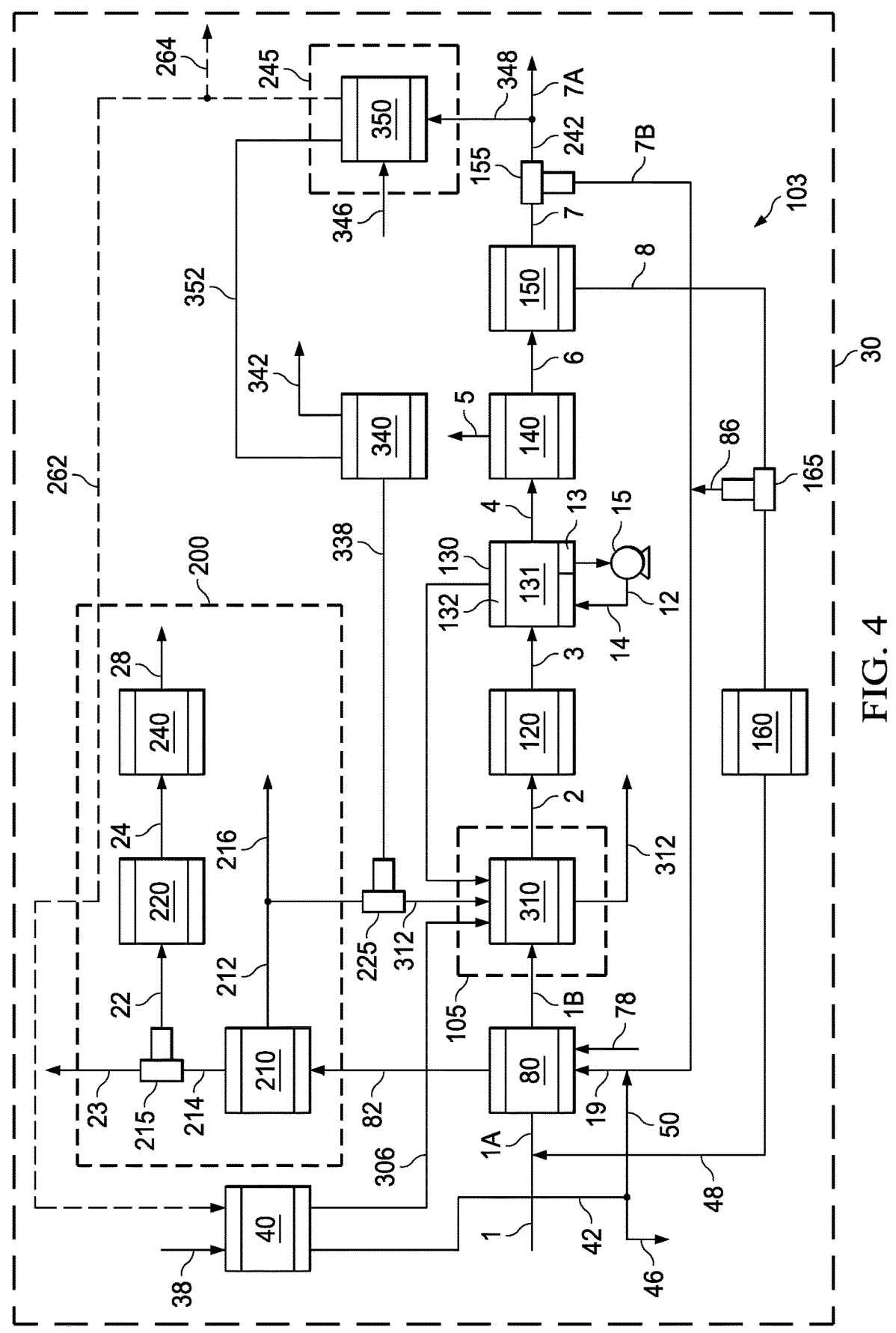
FIG. 4 illustrates a further process and apparatus for reforming to produce hydrogen.

Referring to FIG. 4, a process and apparatus 103 may substantially similar to the process and apparatus 102 depicted in FIG. 3. However, the electricity generator 245 can be a hydrogen fuel cell 350. Similarly as the gas turbine 250, the hydrogen fuel cell 350 can be sized to provide sufficient electricity 262, such as at least a portion of the electricity, not only for the process and apparatus 103, but also sufficient electricity 264 for the hydrocarbon manufacturing plant 30. Thus, the process and apparatus 102 can be integrated in the hydrocarbon manufacturing plant 30 and at least a portion 264 of the generated electricity is provided to one or more manufacturing units 30 outside the process and apparatus 102 and within the hydrocarbon manufacturing plant 30. The hydrogen fuel cell 350 can receive a part 348 of the hydrogen product 7 and ambient air 346 to generate electricity. The part 348 may be at least about 99.0%, about 99.9%, about 99.92%, or about 99.95% by mole hydrogen. The hydrogen fuel cell 350 may be operated at a pressure of about 1 bar to about 10 bar, about 1 bar to about 5 bar, or even about 3 bar, and a temperature of about 50° C. to about 100° C., about 60° C. to about 80° C., or even about 70° C. The fuel cell exhaust 352 including water, nitrogen, argon, and unreacted oxygen may optionally be sent to a cooler 340, such as a cooling water heat exchanger. The cooler may cool the fuel cell exhaust 352 to condense water and vent nitrogen, oxygen, and water in a stream 342 with the remainder exiting as a stream 338 including the condensed water passing through a splitter 225 to be combined with the stream 212 to form the stream 216 for internal water make-up. The other part as a stream 312 can be routed to the autothermal reformer 310 for producing steam, as discussed above. Thus, at least a portion 338 of the fuel cell exhaust 352 can be sent to the autothermal reformer 310.

The processes and apparatuses 102 and 103 can be installed as an entire unit in the hydrocarbon manufacturing plant 30. Alternatively, an existing unit can be modified. As an example, a process and apparatus 102 can have an existing autothermal reformer 310 and associated equipment as depicted with exception of the absorption unit 140, compressor 160, and electricity generator 245. In this embodiment a gas turbine 250 can be installed optionally along with the absorption unit 140 and the compressor 160. Similarly, the process and apparatus 103 can have an existing autothermal reformer 310 and associated equipment as depicted with exception of the absorption unit 140, compressor 160, and electricity generator 245. In this embodiment, a hydrogen fuel cell 350 and optionally a cooler 340 can be installed. Also, optionally the absorption unit 140 and the compressor 160 are installed. Thus, installing these components to an existing manufacturing unit can reduce overall carbon venting. In either installation, at least a portion 244 as depicted in FIG. 3 or a portion 348 as depicted in FIG. 4 can be received by the electricity generator 245 from the pressure swing adsorption unit 150.

Moreover, a pipe can be installed to route the cooled fuel cell exhaust 338 to the reformer 105, including the autothermal reformer 310, and installing an autothermal preheater 80 upstream of the autothermal reformer 310.

Having described various systems and methods herein, certain aspects and advantages of the discloses process and apparatus can include:

In a first aspect, a process for producing hydrogen from natural gas, the process comprises: introducing a feed natural gas, a feed steam, and a fuel to a steam methane reformer to produce unshifted synthesis gas (syngas); introducing the unshifted syngas to a water gas shift unit to produce a shifted syngas; removing $CO_2$ from the shifted syngas to produce a $CO_2$ depleted syngas and a $CO_2$ product; introducing the $CO_2$ depleted syngas to a pressure swing adsorption unit to produce a hydrogen product and an off-gas comprising carbon monoxide, carbon dioxide, unreacted methane; splitting the hydrogen product into a first hydrogen portion and a second hydrogen portion; splitting the off-gas into a first off-gas portion and a second off-gas portion; combining the second hydrogen portion and the second off-gas portion to form a fuel recycle stream, wherein the fuel that is introduced to the steam methane reformer comprises the fuel recycle stream; and optionally compressing and introducing the first off-gas portion to the steam methane reformer with the feed natural gas.

In a second aspect, a process for producing hydrogen from natural gas, the process comprises: introducing a feed natural gas, a feed steam, and a fuel to a steam methane reformer to produce unshifted synthesis gas (syngas); introducing the unshifted syngas to a water gas shift unit to produce a shifted syngas; removing $CO_2$ from the shifted syngas to produce a $CO_2$ depleted syngas and a $CO_2$ product; splitting the $CO_2$ depleted syngas into a first $CO_2$ depleted syngas portion and a second $CO_2$ depleted syngas portion; introducing the first $CO_2$ depleted syngas portion to a pressure swing adsorption unit to produce a hydrogen product and an off-gas comprising carbon monoxide, carbon dioxide, unreacted methane; introducing the second $CO_2$ depleted syngas portion to a membrane unit to produce a hydrogen permeate and a retentate; splitting the off-gas into a first off-gas portion and a second off-gas portion; combining the hydrogen permeate and the second off-gas portion to form a fuel recycle stream, wherein the fuel that is introduced to the steam methane reformer comprises the fuel recycle stream; optionally compressing the retentate and the first off-gas portion to form a feed recycle; and optionally introducing the feed recycle to the steam methane reformer with the feed natural gas.

In a third aspect, a hydrogen production system comprises: a steam methane reformer configured to contact methane and steam with a catalyst to form an unshifted syngas; a water gas shift unit coupled to the steam methane reformer and configured to receive the unshifted syngas from the steam methane reformer and to produce a shifted syngas; an absorption unit coupled to the water gas shift unit and configured to receive the shifted syngas, remove carbon dioxide from the shifted syngas, and produce a $CO_2$ depleted syngas and a $CO_2$ product; a pressure swing adsorption unit coupled to the absorption unit, wherein the pressure swing adsorption unit is configured to receive the $CO_2$ depleted syngas from the absorption unit and to produce a hydrogen product and an off-gas; and a first splitter coupled to the pressure swing adsorption unit and configured to split the hydrogen product into a first hydrogen portion and a second hydrogen portion; a second splitter coupled to the pressure swing adsorption unit and configured to split the off-gas into a first off-gas portion and a second off-gas portion; a fuel recycle stream comprising the second hydrogen portion and the second off-gas portion, wherein the second hydrogen portion and the second off-gas portion are configured to combine to form the fuel recycle stream, wherein the fuel recycle stream is connected to the steam methane reformer and configured to feed the fuel recycle stream to the steam methane reformer; an optional compressor configured to receive the first off-gas portion and provide the compressed off-gas to the steam methane reformer.

In a fourth aspect, a hydrogen production system comprises: a steam methane reformer configured to contact methane and steam with a catalyst to form an unshifted syngas; a water gas shift unit coupled to the steam methane reformer and configured to receive the unshifted syngas from the steam methane reformer and to produce a shifted syngas; an absorption unit coupled to the water gas shift unit and configured to receive the shifted syngas, remove carbon dioxide from the shifted syngas, and produce a $CO_2$ depleted syngas and a $CO_2$ product; a first splitter configured to split the $CO_2$ depleted syngas into a first $CO_2$ depleted syngas portion and a second $CO_2$ depleted syngas portion; a pressure swing adsorption unit coupled to the first splitter, wherein the pressure swing adsorption unit is configured to receive the first $CO_2$ depleted syngas portion from the first splitter and to produce a hydrogen product and an off-gas; and a membrane unit coupled to the first splitter, wherein the membrane unit is configured to receive the second $CO_2$ depleted syngas portion from the first splitter and to produce a hydrogen permeate and a retentate; a second splitter coupled to the pressure swing adsorption unit and configured to split the off-gas into a first off-gas portion and a second off-gas portion; a fuel recycle stream comprising the hydrogen permeate and the second off-gas portion, wherein the hydrogen permeate and the second off-gas portion are configured to combine to form the fuel recycle stream, wherein the fuel recycle stream is connected to the steam methane reformer and configured to feed the fuel recycle stream to the steam methane reformer; an optional compressor configured to receive the first off-gas portion and the retentate, and to provide the compressed recycle feed to the steam methane reformer.

In a fifth aspect, a process for producing hydrogen from natural gas, the process comprises: introducing a feed natural gas, a feed steam, and a fuel to a reformer to produce unshifted synthesis gas (syngas); introducing the unshifted syngas to a water gas shift unit to produce a shifted syngas; removing $CO_2$ from the shifted syngas to produce a $CO_2$ depleted syngas and a $CO_2$ product; introducing the $CO_2$ depleted syngas to a pressure swing adsorption unit to produce a hydrogen product and an off-gas comprising carbon monoxide, carbon dioxide, unreacted methane; and compressing and introducing at least a portion of the off-gas to the reformer with the feed natural gas.

A sixth aspect can include the process for producing hydrogen from natural gas of the fifth aspect further comprising: splitting the hydrogen product into a first hydrogen portion and a second hydrogen portion; splitting the off-gas into a first off-gas portion and a second off-gas portion; combining the second hydrogen portion and the second off-gas portion to form a fuel recycle stream, wherein the fuel that is introduced to the reformer comprises the fuel recycle stream and compressing and introducing the first off-gas portion to the reformer with the feed natural gas.

A seventh aspect can include the process for producing hydrogen from natural gas of the fifth or sixth aspect further comprising: splitting the $CO_2$ depleted syngas into a first $CO_2$ depleted syngas portion and a second $CO_2$ depleted syngas portion; introducing the first $CO_2$ depleted syngas portion to the pressure swing adsorption unit to produce a hydrogen product and an off-gas comprising carbon monoxide, carbon dioxide, unreacted methane; introducing the second $CO_2$ depleted syngas portion to a membrane unit to produce a hydrogen permeate and a retentate; splitting the off-gas into a first off-gas portion and a second off-gas portion; and combining the hydrogen permeate and the second off-gas portion to form a fuel recycle stream, wherein the fuel that is introduced to the reformer comprises the fuel recycle stream.

In an eighth aspect, a process for reforming for producing hydrogen and generating electricity, comprises: introducing a feed comprising a hydrocarbon stream to a reformer to produce unshifted synthesis gas (syngas); introducing the unshifted syngas to a water gas shift unit to produce a shifted syngas; removing $CO_2$ from the shifted syngas to produce a $CO_2$ depleted syngas and a $CO_2$ product; introducing the $CO_2$ depleted syngas to a pressure swing adsorption unit to produce a hydrogen product and an off-gas comprising carbon monoxide, carbon dioxide, unreacted methane; splitting a portion of the hydrogen product; and providing the portion of the hydrogen product to an electricity generator for generating electricity for use within the process.

A ninth aspect can include a process for reforming for producing hydrogen and generating electricity of the eighth aspect, wherein the reformer comprises an autothermal reformer.

A tenth aspect can include a process for reforming for producing hydrogen and generating electricity of the eighth or ninth aspect, wherein the electricity generator comprises a gas turbine.

An eleventh aspect can include a process for reforming for producing hydrogen and generating electricity of any of the eighth to tenth aspects, further comprising sending a gas turbine exhaust to a flue gas treatment system.

A twelfth aspect can include a process for reforming for producing hydrogen and generating electricity of any of the eighth to eleventh aspects, further comprising sending at least a portion of the electricity to power an air separation unit that provides oxygen to the autothermal reformer.

A thirteenth aspect can include a process for reforming for producing hydrogen and generating electricity of any of the eighth to twelfth aspects, wherein the air separation unit receives air and produces nitrogen and oxygen, wherein the nitrogen is combined with the portion of the hydrogen product upstream of the electricity generator.

A fourteenth aspect can include a process for reforming for producing hydrogen and generating electricity of any of the eighth to thirteenth aspects, wherein the process is integrated in a hydrocarbon manufacturing plant and at least a portion of the generated electricity is provided to one or more manufacturing units outside the process and within the hydrocarbon manufacturing plant.

A fifteenth aspect can include a process for reforming for producing hydrogen and generating electricity of any of the eighth to fourteenth aspects, wherein the electricity generator comprises a hydrogen fuel cell.

A sixteenth aspect can include a process for reforming for producing hydrogen and generating electricity of any of the eighth to fifteenth aspects, further comprising providing air to the hydrogen fuel cell and sending from the hydrogen fuel cell a fuel cell exhaust comprising water, nitrogen, and oxygen to the autothermal reformer.

A seventeenth aspect can include a process for reforming for producing hydrogen and generating electricity of any of the eighth to sixteenth aspects, further comprising cooling the fuel cell exhaust prior to sending to the autothermal reformer.

An eighteenth aspect can include a process for reforming for producing hydrogen and generating electricity of any of the eighth to seventeenth aspects, further comprising sending at least a portion of the fuel cell exhaust to an autothermal reformer.

In a nineteenth aspect, a process for installing an electricity generator in at reforming unit for producing hydrogen wherein the reforming unit comprises a reformer, a water gas shift unit, a shifted syngas cooling unit, and a pressure swing adsorption unit, comprises: installing an electricity generator downstream of the pressure swing adsorption unit to receive at least a portion of a hydrogen product.

A twentieth aspect can include a process for installing an electricity generator in at reforming unit for producing hydrogen wherein the reforming unit comprises a reformer, a water gas shift unit, a shifted syngas cooling unit, and a pressure swing adsorption unit of the nineteenth aspect, further comprising installing an adsorption unit to receive an effluent from the shifted syngas cooling unit and provide a stream to the hydrogen pressure swing adsorption unit and a compressor for receiving at least a portion of an off-gas from the pressure swing adsorption unit.

A twenty first aspect can include a process for installing an electricity generator in at reforming unit for producing hydrogen wherein the reforming unit comprises a reformer, a water gas shift unit, a shifted syngas cooling unit, and a pressure swing adsorption unit of the nineteenth or twentieth aspect, wherein the electricity generator comprises a gas turbine.

A twenty second aspect can include a process for installing an electricity generator in at reforming unit for producing hydrogen wherein the reforming unit comprises a reformer, a water gas shift unit, a shifted syngas cooling unit, and a pressure swing adsorption unit any of the nineteenth to twenty first aspects, wherein the electricity generator comprises a hydrogen fuel cell.

A twenty third aspect can include a process for installing an electricity generator in at reforming unit for producing hydrogen wherein the reforming unit comprises a reformer, a water gas shift unit, a shifted syngas cooling unit, and a pressure swing adsorption unit any of the nineteenth to twenty second aspects, further comprising installing a cooler downstream of the hydrogen fuel cell to receive a fuel cell exhaust.

A twenty fourth aspect can include a process for installing an electricity generator in at reforming unit for producing hydrogen wherein the reforming unit comprises a reformer, a water gas shift unit, a shifted syngas cooling unit, and a pressure swing adsorption unit any of the nineteenth to twenty third aspects, further comprising installing a pipe to route the cooled fuel cell exhaust to the reformer, comprising an autothermal reformer and installing an autothermal preheater upstream the autothermal reformer.

While multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

What is claimed is:

1. A process for producing hydrogen from natural gas, the process comprising:

introducing a feed natural gas, a feed steam, and a fuel to a reformer to produce an unshifted synthesis gas (syngas);

introducing the unshifted syngas to a multi-stage water gas shift unit comprising a high temperature shift reactor and a low temperature shift reactor and comprising a sour shift catalyst to produce a shifted syngas;

introducing the shifted syngas to a shifted syngas cooling unit comprising a heat exchanger configured as a cross-exchanger having a shifted syngas side and a coolant side, wherein the heat exchanger is configured for removing aqueous condensate from the shifted syngas on the shifted syngas side;

removing the aqueous condensate from the shifted syngas side of the heat exchanger;

introducing the aqueous condensate to the coolant side of the heat exchanger via a pump configured to facilitate flow of the aqueous condensate from the shifted syngas side to the coolant side;

producing a heat exchanger steam comprising a dirty steam including dissolved carbon dioxide and ammonia from the aqueous condensate on the coolant side of the heat exchanger;

feeding the heat exchanger steam without treatment to the reformer;

removing $CO_2$ from the shifted syngas;

introducing $CO_2$ depleted syngas to a pressure swing adsorption unit to produce a hydrogen product and an off-gas comprising carbon monoxide, carbon dioxide, unreacted methane; and compressing and introducing at least a portion of the off-gas to the reformer with the feed natural gas.

2. The process of claim 1, further comprising:

splitting the hydrogen product into a first hydrogen portion and a second hydrogen portion;

splitting the off-gas into a first off-gas portion and a second off-gas portion;

combining the second hydrogen portion and the second off-gas portion to form a fuel recycle stream, wherein the fuel that is introduced to the reformer comprises the fuel recycle stream; and compressing and introducing the first off-gas portion to the reformer with the feed natural gas.

3. The process of claim 1, further comprising:

splitting the $CO_2$ depleted syngas into a first $CO_2$ depleted syngas portion and a second $CO_2$ depleted syngas portion;

introducing the first $CO_2$ depleted syngas portion to the pressure swing adsorption unit to produce the hydrogen product and the off-gas comprising carbon monoxide, carbon dioxide, and unreacted methane;

introducing the second $CO_2$ depleted syngas portion to a membrane unit to produce a hydrogen permeate and a retentate;

splitting the off-gas into a first off-gas portion and a second off-gas portion; and combining the hydrogen permeate and the second off-gas portion to form a fuel recycle stream, wherein the fuel that is introduced to the reformer comprises the fuel recycle stream.

4. The process of claim 1, wherein the aqueous condensate is at a temperature of from about 100° C. to about 150° C. when removed from the shifted syngas.

5. The process of claim 1, wherein the heat exchanger steam is an only feed steam introduced to the reformer during steady state operation.

6. The process of claim 1, wherein the high temperature shift reactor operates at a temperature of from about 320° C. to about 450° C. and the low temperature shift reactor operates at a temperature of from about 180° C. to about 240° C.

7. The process according to claim 1, wherein the heat exchanger steam replaces a boiler feed water thereby avoiding a requirement of using the boiler feed water.

8. The process according to claim 1, further comprising:

an absorption unit comprising a lean physical solvent comprising propylene carbonate to produce a $CO_2$ enriched physical solvent and a $CO_2$ depleted syngas, and flashing the $CO_2$ enriched physical solvent in a flash tank to produce a $CO_2$ product and the lean physical solvent, wherein the flash tank operates without a stripper and without a steam-fed reboiler.

9. The process according to claim 1, wherein a carbon dioxide recovery of the process is equal to or greater than 70 mol % based on a sum amount of $CO_2$ introduced into the process plus $CO_2$ generated in the process.

10. A process for reforming for producing hydrogen and generating electricity, comprising:

introducing a feed comprising a hydrocarbon stream to a reformer to produce an unshifted synthesis gas (syngas);

introducing the unshifted syngas to a multi-stage water gas shift unit comprising a high temperature shift reactor and a low temperature shift reactor to produce a shifted syngas;

introducing the shifted syngas to a shifted syngas cooling unit comprising a heat exchanger configured as a cross-exchanger having a shifted syngas side and a coolant side for removing aqueous condensate from the shifted syngas;

removing the aqueous condensate from the shifted syngas side of the heat exchanger;

introducing the aqueous condensate to the coolant side of the heat exchanger via a pump configured to facilitate flow of the aqueous condensate from the shifted syngas side to the coolant side;

producing a heat exchanger steam comprising a dirty steam including dissolved carbon dioxide and ammonia from the aqueous condensate;

feeding the heat exchanger steam without treatment to the reformer, wherein the heat exchanger steam replaces a boiler feed water thereby avoiding a requirement of using the boiler feed water;

removing $CO_2$ from the shifted syngas in an absorption unit using a physical solvent regenerated by flash regeneration without a stripper and without a steam-fed reboiler to produce a $CO_2$ depleted syngas and a $CO_2$ product;

introducing the $CO_2$ depleted syngas to a pressure swing adsorption unit to produce a hydrogen product and an off-gas comprising carbon monoxide, carbon dioxide, unreacted methane;

splitting a portion of the hydrogen product; and providing the portion of the hydrogen product to an electricity generator for generating electricity for use within the process, wherein the process achieves a carbon dioxide capture of equal to or greater than 70 mol % based on a sum amount of $CO_2$ introduced into the process plus $CO_2$ generated in the process.

11. The process according to claim 10, wherein the reformer comprises an autothermal reformer.

12. The process according to claim 11, further comprising sending at least a portion of the electricity to power an air separation unit that provides oxygen to the autothermal reformer, wherein the air separation unit receives air and produces nitrogen and oxygen, and wherein the nitrogen is combined with the portion of the hydrogen product upstream of the electricity generator.

13. The process according to claim 11, wherein the electricity generator comprises a gas turbine, and further comprising sending a gas turbine exhaust to a flue gas treatment system.

14. The process according to claim 11, wherein the process is integrated in a hydrocarbon manufacturing plant and at least a portion of a generated electricity is provided to one or more manufacturing units outside the process and within the hydrocarbon manufacturing plant.

15. A process for installing apparatus in a reforming unit for producing hydrogen, wherein the reforming unit comprises a reformer, a water gas shift unit, and a pressure swing adsorption unit, the process comprising:

installing a shifted syngas cooling unit downstream of the water gas shift unit, the shifted syngas cooling unit comprising a heat exchanger configured as a cross-exchanger having a shifted syngas side configured to receive a shifted syngas and remove aqueous condensate therefrom, and a coolant side configured to receive the aqueous condensate and convert the aqueous condensate to steam;

installing a pump configured to transfer the aqueous condensate from the shifted syngas side to the coolant side of the heat exchanger;

connecting a steam outlet of the coolant side of the heat exchanger to a steam inlet of the reformer such that dirty steam comprising dissolved carbon dioxide and ammonia flows without treatment from the heat exchanger to the reformer;

installing an absorption unit downstream of the shifted syngas cooling unit to receive shifted syngas from the shifted syngas cooling unit, wherein the absorption unit comprises a physical solvent absorption system with flash regeneration configured to operate without a stripper and without a steam-fed reboiler;

installing the absorption unit and the shifted syngas cooling unit such that a boiler feed water supply to the reformer is eliminated and replaced by the steam from the heat exchanger; and configuring the process to achieve a carbon dioxide capture of equal to or greater than 70 mol % based on a sum amount of $CO_2$ introduced into the process plus $CO_2$ generated in the process.

16. The process according to claim 15, further comprising:

installing an electricity generator downstream of the pressure swing adsorption unit to receive at least a portion of a hydrogen product; and installing a compressor for receiving at least a portion of an off-gas from the pressure swing adsorption unit.

17. The process according to claim 16, wherein the electricity generator comprises a gas turbine.

18. The process according to claim 16, wherein the electricity generator comprises a hydrogen fuel cell.

19. The process according to claim 18, further comprising installing a cooler downstream of the hydrogen fuel cell to receive a fuel cell exhaust.

20. The process according to claim 19, wherein the reformer comprises an autothermal reformer, and the process further comprises installing a pipe to route cooled fuel cell exhaust to the autothermal reformer and installing an autothermal preheater upstream of the autothermal reformer.

\* \* \* \* \*